United States Patent
Nakada

[19]

[11] Patent Number: 5,809,298

[45] Date of Patent: Sep. 15, 1998

[54] FILE SERVER

[75] Inventor: Masahiro Nakada, Kawasaki, Japan

[73] Assignee: Fujitsu Limited, Kawasaki, Japan

[21] Appl. No.: 501,571

[22] Filed: Jul. 12, 1995

[30] Foreign Application Priority Data

Sep. 9, 1994 [JP] Japan .................................. 6-252622

[51] Int. Cl.$^6$ .................................................. G06F 17/30

[52] U.S. Cl. .............................. 395/615; 395/601; 380/4; 364/479.04

[58] Field of Search .................................. 395/600, 601, 395/615, 800; 380/4; 364/479.04

[56] References Cited

U.S. PATENT DOCUMENTS

| | | | |
|---|---|---|---|
| 4,247,106 | 1/1981 | Jeffers et al. | 463/29 |
| 4,439,670 | 3/1984 | Basset et al. | 235/382 |
| 4,446,519 | 5/1984 | Thomas | 395/491 |
| 4,466,059 | 8/1984 | Bastian et al. | 364/200 |
| 4,484,217 | 11/1984 | Block et al. | 348/3 |
| 4,558,176 | 12/1985 | Arnold et al. | 380/4 |
| 4,590,557 | 5/1986 | Lillie | 395/651 |
| 4,646,234 | 2/1987 | Tolman et al. | 380/4 |
| 4,649,510 | 3/1987 | Schmidt | 380/4 |
| 4,654,799 | 3/1987 | Ogaki et al. | 364/479.04 |
| 4,658,093 | 4/1987 | Hellman | 380/25 |
| 4,672,554 | 6/1987 | Ogaki | 364/479.04 |
| 4,674,055 | 6/1987 | Ogaki et al. | 364/479.04 |
| 4,740,890 | 4/1988 | William | 395/186 |
| 4,771,375 | 9/1988 | Beglin et al. | 364/200 |
| 4,780,905 | 10/1988 | Cruts et al. | 380/44 |
| 4,787,050 | 11/1988 | Suzuki | 364/479.04 |
| 4,816,653 | 3/1989 | Anderl et al. | 235/380 |
| 4,816,654 | 3/1989 | Anderl et al. | 235/380 |
| 4,817,140 | 3/1989 | Chandra et al. | 380/4 |
| 4,864,516 | 9/1989 | Gaither et al. | 395/806 |
| 4,879,645 | 11/1989 | Tamada et al. | 235/380 |
| 4,949,257 | 8/1990 | Orbach | 395/221 |
| 4,993,030 | 2/1991 | Krakauer et al. | 371/40.1 |
| 4,999,806 | 3/1991 | Chernow et al. | 395/712 |
| 5,006,849 | 4/1991 | Baarman et al. | 341/106 |
| 5,008,814 | 4/1991 | Mathur | 395/200.1 |
| 5,014,234 | 5/1991 | Edwards, Jr. | 395/186 |
| 5,016,009 | 5/1991 | Whiting et al. | 341/67 |
| 5,051,822 | 9/1991 | Rhoades | 463/25 |
| 5,056,009 | 10/1991 | Mizuta | 395/490 |
| 5,103,392 | 4/1992 | Mori | 380/4 |
| 5,103,476 | 4/1992 | Waite et al. | 380/4 |
| 5,131,087 | 7/1992 | Warr | 395/425 |

(List continued on next page.)

FOREIGN PATENT DOCUMENTS 5-73492  3/1993  Japan .

OTHER PUBLICATIONS

Japanese Patent Laid–Open Publication No. 57–127249, Aug. 7, 1982 (equivalent to Japanese Patent Publication No. 61–22815).

Japanese Patent Laid–Open Publication No. 5–89363, Apr. 9, 1993.

Japanese Patent Laid–Open Publication No. 5–266575, Oct. 15, 1993.

Japanese Patent Laid–Open Publication No. 5–298085, Nov. 12, 1993.

Japanese Patent Laid–Open Publication No. 6–95871, Apr. 8, 1994.

*Primary Examiner*—Thomas G. Black
*Assistant Examiner*—Donald D. Min
*Attorney, Agent, or Firm*—Staas & Halsey

[57] ABSTRACT

The present invention was made in order to provide a file server, wherein a distributing device for storing parts of data to be stored by a server between the server for providing data and a terminal device for outputting data provided by the server, the distributing device reads data and sends them to the terminal device if said data requested to be provided have been stored when receiving the requests from the terminal device, transfers the provision requests to the server if the data requested to be provided have not been stored, and when receiving requested data from the server, it newly registers the requested data and at the same time sends the data to the terminal device.

9 Claims, 36 Drawing Sheets

U.S. PATENT DOCUMENTS

| | | | |
|---|---|---|---|
| 5,166,886 | 11/1992 | Molnar et al. | 364/479.04 |
| 5,181,107 | 1/1993 | Rhoades | 348/13 |
| 5,199,066 | 3/1993 | Logan | 380/4 |
| 5,214,697 | 5/1993 | Saito | 380/4 |
| 5,222,134 | 6/1993 | Waite et al. | 380/4 |
| 5,245,330 | 9/1993 | Wassink | 340/825.34 |
| 5,247,670 | 9/1993 | Matsunaga | 395/650 |
| 5,267,171 | 11/1993 | Suzuki et al. | 364/479.04 |
| 5,381,539 | 1/1995 | Yanai et al. | 395/425 |
| 5,418,922 | 5/1995 | Liu | 395/425 |
| 5,452,447 | 9/1995 | Nelson et al. | 395/650 |
| 5,500,923 | 3/1996 | Kuroshima et al. | 395/114 |
| 5,504,896 | 4/1996 | Schell et al. | 395/650 |
| 5,511,208 | 4/1996 | Boyles et al. | 395/800 |
| 5,542,023 | 7/1996 | Sakai et al. | 395/154 |

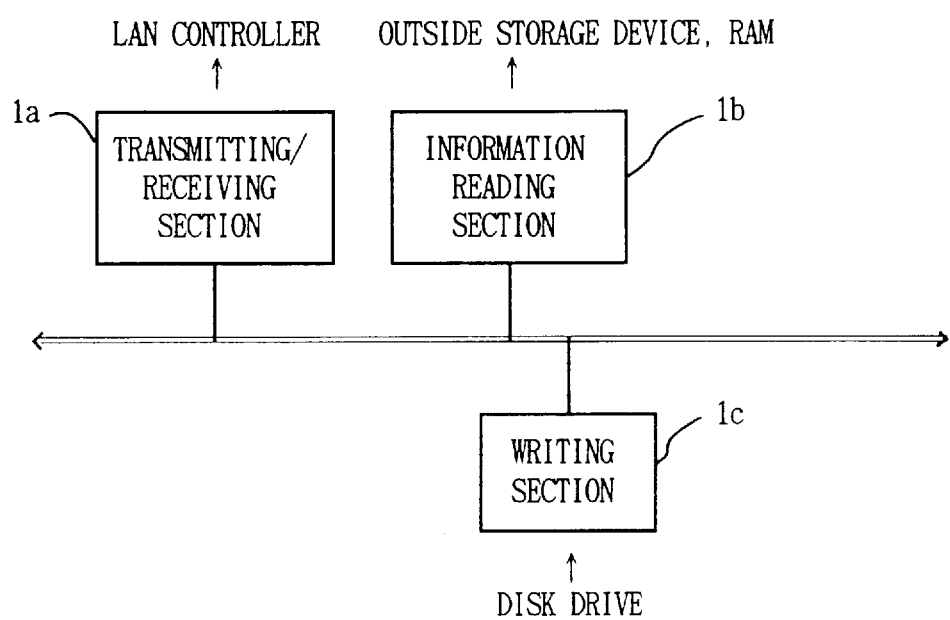
F I G. 4

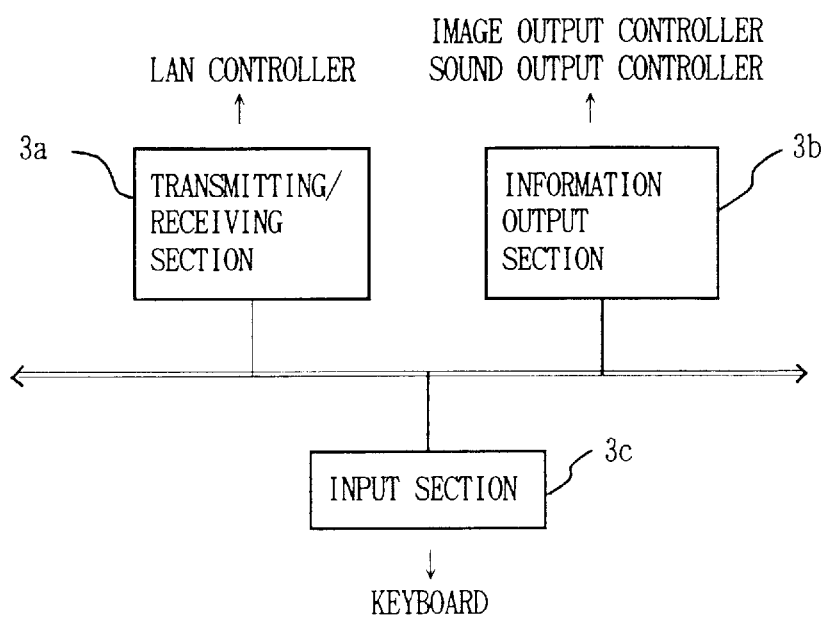
F I G. 8

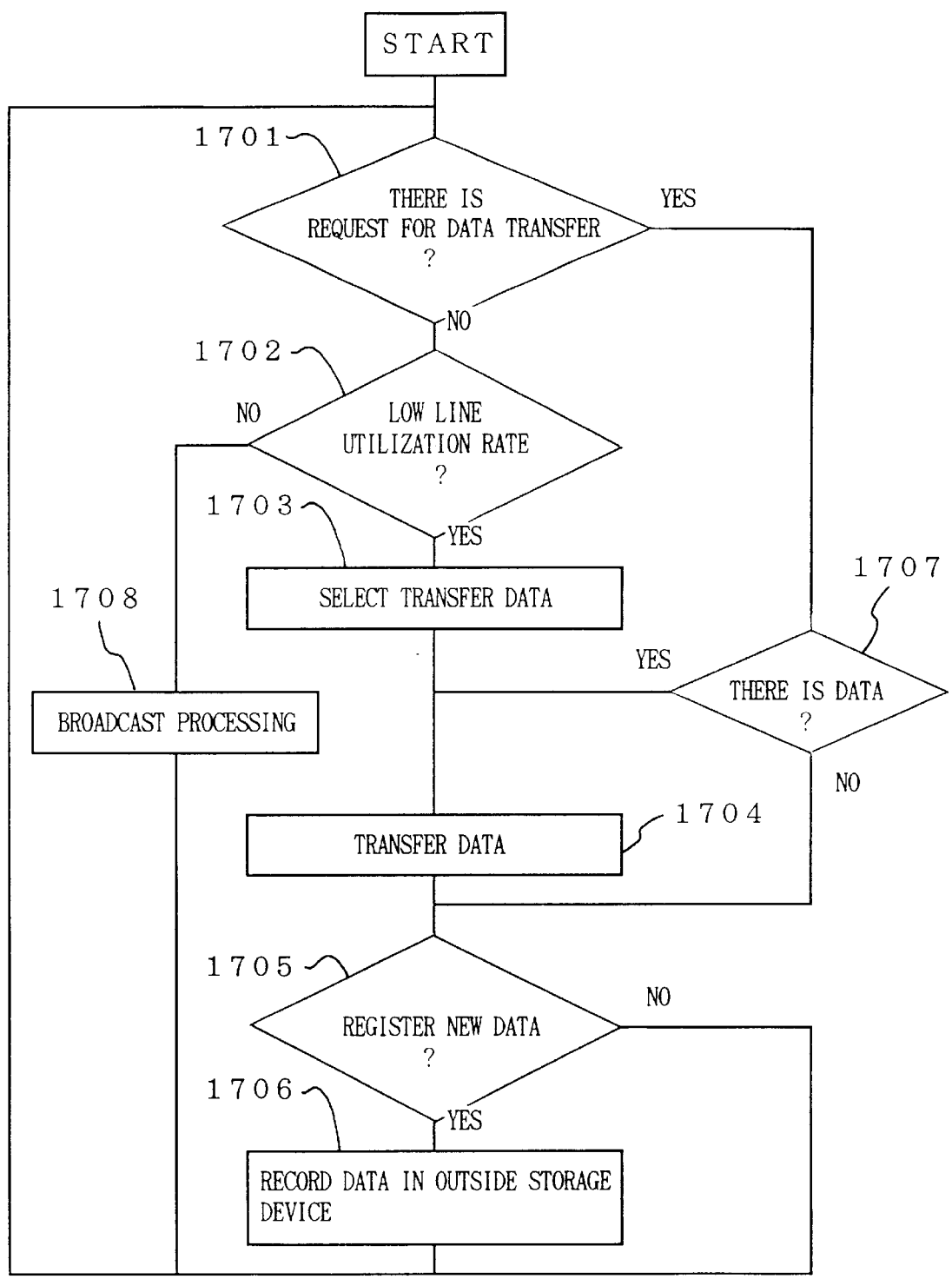
F I G. 1 7

| DATA NAME | CATEGORY CODE | DATA LENGTH | DATA |
|---|---|---|---|

FIG. 19

| CATEGORY CODE | IDENTIFICATION INFORMATION |
|---|---|
| DOMESTIC NEWS | ○ |
| OVERSEAS NEWS | × |
| SPORTS | ○ |
| ⋮ | ⋮ |

FIG. 20

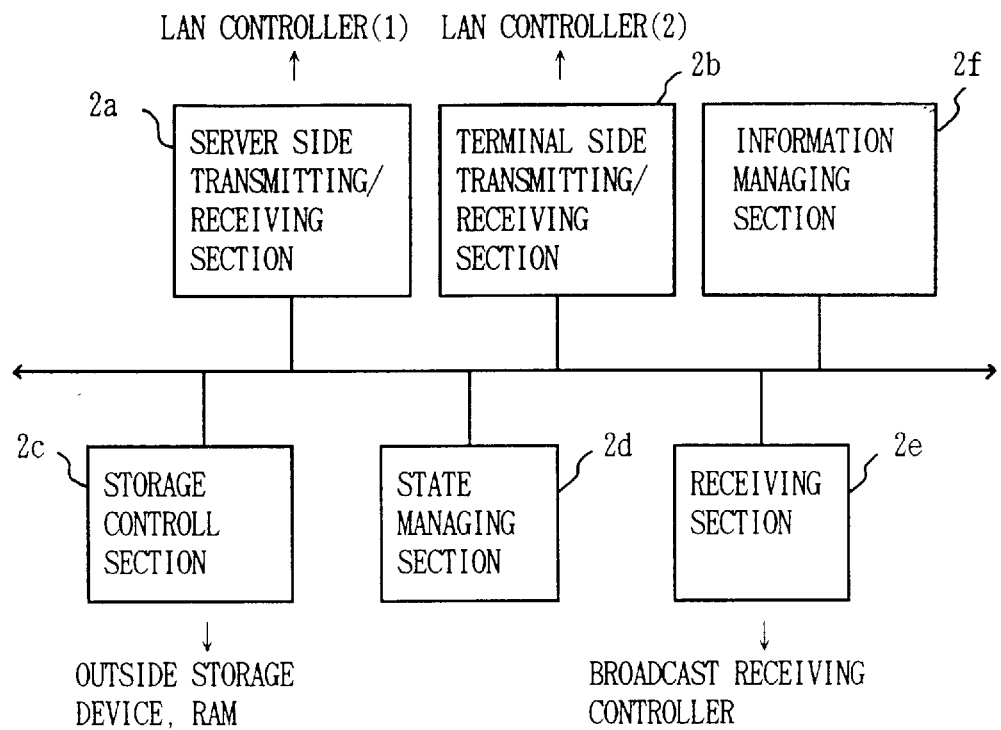
FIG. 21
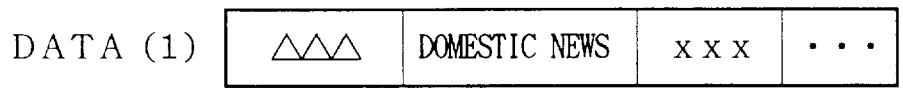
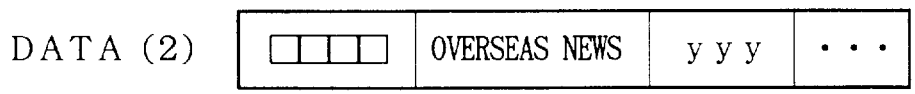
FIG. 22

| CATEGORY CODE | NUMBER OF REQUEST TIME |
|---|---|
| SPORTS(BASEBALL) | 20 |
| SPORTS(SOCCER) | 10 |
| SPORTS(TENNIS) | 30 |
| SPORTS(SUMO) | 10 |
| SPORTS(TABLE TENNIS) | 0 |
| ⋮ | ⋮ |
| NEWS(OVERSEAS) | 10 |
| NEWS(DOMESTIC) | 40 |
| NEWS(POLITICS) | 22 |
| NEWS(ECONOMICS) | 63 |
| NEWS(SCIENCE) | 5 |
| ⋮ | ⋮ |

FIG. 24

| CATEGORY CODE | NUMBER OF REQUEST TIME |
|---|---|
| NEWS (ECONOMICS) | 6 3 |
| NEWS (DOMESTIC) | 4 0 |
| SPORTS (TENNIS) | 3 0 |
| NEWS (POLITICS) | 2 2 |
| SPORTS (BASEBALL) | 2 0 |
| SPORT (SOCCER) | 1 0 |
| NEWS (OVERSEAS) | 1 0 |
| SPORTS (SUMO) | 1 0 |
| NEWS (SCIENCE) | 5 |
| SPORTS (TABLE TENNIS) | 0 |
| ⋮ | ⋮ |

FIG. 27

| | | | | |
|---|---|---|---|---|
| DATA (1) | △△△ | DOMESTIC NEWS | x x x | · · · |

| | | | | |
|---|---|---|---|---|
| DATA (2) | ▭▭▭ | SPORTS(SOCCER) | y y y | · · · |

| | | | | |
|---|---|---|---|---|
| DATA (3) | ○○○○ | SPORTS(TABLE TENNIS) | z z z | · · · |

FIG. 28

| DATA NEME | CATEGORY CODE | MAKING DATE | FINISHING DATE | DATA LENGTH | DATA |
|---|---|---|---|---|---|

F I G. 3 2

| DATA NAME | CATEGORY CODE | DATA LENGTH | TRANSMISSION STARTING TIME(1) | TRANSMISSION STARTING TIME(2) | TRANSMISSION STARTING TIME(3) |
|---|---|---|---|---|---|

FIG. 34

| DATA NAME | DATA LENGTH | DATA |
|---|---|---|

FIG. 35

FILE SERVER

BACKGROUND OF THE INVENTION

(1) Industrial Field

The present invention relates to a file server for providing softwares such as video or sound works and the like, in particular digital information softwares, to a plurality of terminal devices.

(2) Conventional Technology

Recently, with the advance of communication and information processing technologies it has become possible to provide various types of information services.

In particular, services for providing video works of movies, etc., and sound works of music, etc., to user terminals utilizing communication lines, etc., are becoming popular.

In order to realize such services, there is a server system by which data requested by users can be provided through communication lines, etc.

This server system is constructed by connecting a server storing a plurality of video or sound works and terminal devices owned by users by communication lines. The users transmit requests of provision of desired data from their terminal devices to the server. Upon receiving such requests from the terminal devices the server will read the data desired by the users and sent them to the terminal devices.

At the server system mentioned above, however, in the case where the size and quantity of data and the number of users increase and particularly video works of several gigabytes are transferred, the processing capacity of the server will be occupied by this transfer operation. Further, the communication lines connecting the server and the terminal devices will be occupied, as well. In such a case, the server will not be able to accept data providing requests from the other terminals. Though a method utilizing communication lines in time-divisional manner is possible to deal with this problem, processing loads on the server will be increased. Moreover, in the case where the number of users increase, the communication lines will be occupied by providing information to limited user groups. Thus, when the processing capacity of the server and the transmitting capacity of the communication lines are exceeded, the server will not be able to accept requests from the other terminal devices and to provide data until the current processing is completed and some communication lines become available.

Further, even when the server starts processing data provision, transmitting rate will be reduced as it is carried out together with the other processings. Thus, in the case where the users request such punctual information as music, videos or the like, a silent state or omission of some images will be easily generated.

When a number of servers are used in order to prevent throughput reduction, it will be necessary to prepare servers having large-capacity storage devices or lines in knitted form. However, for the former it will be necessary to make adjustments of version number management, etc., within each server. For the latter it will take time to set the lines.

SUMMARY OF THE INVENTION

The present invention was made in order to reduce loads on the server as well as communication lines, to improve the processing capacity of the entire device and to improve quality of services at the file server for connecting the server and the user terminals by the communication lines.

In order to achieve its object, the file server according to the present invention is provided with a distributing device between the server and the terminal devices.

The server is the device for storing a plurality of such data as video works of movies, etc., sound works of music, etc., programs or the like and providing desired data to the users.

The distributing device is for storing data up to a specified number of those owned by the server and providing data desired by the users to their terminals if they are stored. Further, the distributing device will transfer user requests to the server if data desired by the users are not stored. Then, upon receiving data desired by the users from the server, the distributing device will transmit these data to the terminals and at the same time store them. The distributing device is provided with a means for storing information up to a specified number. This storing means is made of, for example, an optical disk for storing information of digital signal form and a driver device. Further, the distributing device includes a server side transmitting/receiving means, a terminal side transmitting/receiving means, a storage control means and a state control means. These components will be made to function when a CPU owned by the distributing device executes control programs.

The storage control means is for reading data from the storing means and writing data thereinto.

The server side transmitting/receiving means is for sending data provision requests to the server and receiving data sent therefrom.

The terminal side transmitting/receiving means is for receiving provision requests from the terminal devices and sending data thereto.

The state control means is for identifying whether there are provision requests received from the terminal devices or not and whether information is currently being provided to the terminal devices or not and monitoring loads on the distributing device.

When the file server according to the present invention is utilized, the users must input commands. specifying desired data to the terminal devices. In this way, the terminal devices will transmit requests of provision of data desired by the users to the distributing device.

At the distributing device, the terminal side transmitting/receiving means receives provision requests. Then, the terminal side transmitting/receiving means will report the requests to the storage control means.

The storage control means identifies whether requested data is stored or not by retrieving data in the storing means. If the requested data is stored in the storing means, the storage control means will read the requested data from the storing means and send them to the terminal side transmitting/receiving means.

The terminal side transmitting/receiving means sends data to the terminal devices.

On the other hand, in the case where the data desired by the users are not stored in the storing means, the storage control means will report the provision requests to the server side transmitting/receiving means.

The server side transmitting/receiving means sends provision requests to the server.

Upon receiving the provision requests the server will send these requested data to the distributing device.

The server side transmitting/receiving means at the distributing device, upon receiving these requested data from the server, will transfer them to the storage control means.

The storage control means writes the requested data into the storing means and at the same time transfer them to the terminal side transmitting/receiving means.

The terminal side transmitting/receiving means sends the requested data to the terminal devices.

The state control means of the distributing device monitors the processing state of the distributing device and will report provision of requests of new data to the server side transmitting/receiving means when there are small loads.

The server side transmitting/receiving means, upon receiving the provision requests from the state control means, will send them to the server. Thus, when loads are small, the distributing device will be able to obtain new information.

Further, it is predetermined that data to be transmitted/received among the server device, the distributing device and the terminal devices must be added with category codes for identifying the kinds of individual data. In this case, the distributing device must be provided with a category identification reference table and an information managing means. The category identification reference table is for registering identification information used to identify whether data belonging to each category is stored or not at every category codes. The information managing means, when receiving new information sent simultaneously from the server, will access to the category code identifying reference table based on the category code of this new information and identify whether the new data will be stored or not referring to the identification information of the category codes mentioned above.

The identification information may be fixed information for identifying storage of the data of each category or the one on the number of requesting times by the users to the data belonging to each category. If the identification information is the latter, the information managing means will detect the category codes of targeted data whenever receiving provision requests from the terminal devices and renew the number of requesting times of the category identification reference table. Further, upon receiving new data sent simultaneously from the server, the information managing means may access to the category identification reference table based on the category codes of these new data and permit storing of the new data if the number of requesting times of the category is over the specified value.

Furthermore, the server may compress and send the data when sending them to the distributing device. Accordingly, at the distributing device the data received from the server will be expanded and sent to the terminal devices.

BRIEF DESCRIPTION OF THE DRAWINGS

FIG. 4 is a block diagram showing the functional construction of a server at the embodiment 2.

FIG. 8 is a view showing the functional construction of a terminal device at the embodiment 2.

FIG. 17 is a flow chart showing the operation of a server at the embodiment 3.

FIG. 19 is a view showing a data structure at the embodiment 4.

FIG. 20 is a view showing the construction of a category identification reference table.

FIG. 21 is a block diagram showing the functional construction of a distributing device at the embodiment 4.

FIG. 22 is a view showing the specific example of data at the embodiment 4.

FIG. 24 is a view showing the construction of a category identification reference table at the embodiment 5.

FIG. 27 is a view showing the construction of a category identification reference table at the embodiment 6.

FIG. 28 is view showing the specific example of data at the embodiment 6.

FIG. 32 is a view showing a data structure at the embodiment 8.

FIG. 34 is a view showing a data attribution structure at the embodiment 9.

FIG. 35 is a view showing the construction of a data main body at the embodiment 9.

DESCRIPTION OF THE PREFERRED EMBODIMENTS

The preferred embodiments of the present invention will be described with reference to the accompanying drawings.

EMBODIMENT 1

Figure 1:
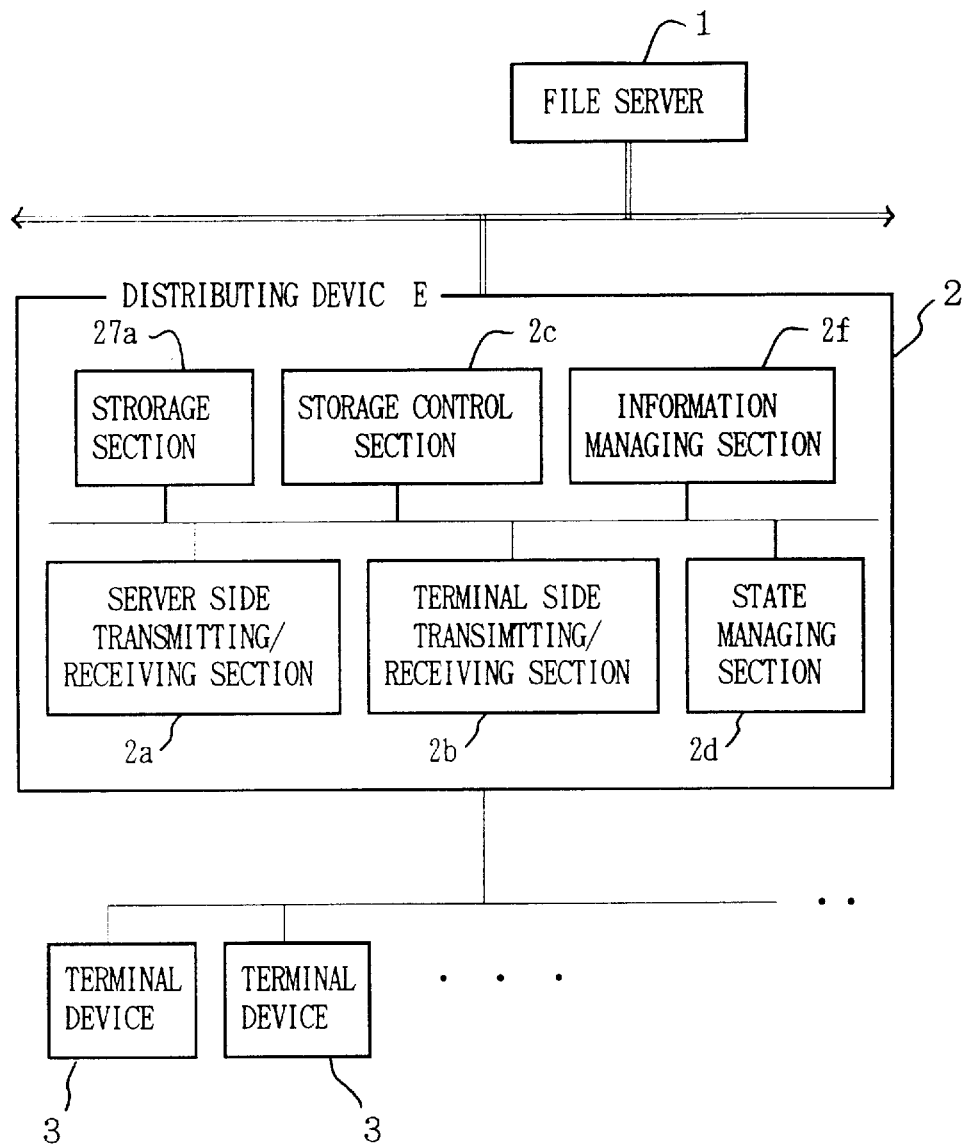
FIG. 1 is a block diagram showing the construction of a file server at the embodiment 1.

The construction of a file server at the embodiment 1 will be described with reference to FIG. 1.

The file server is provided with a distributing device 2 between a server 1 and a terminal device 3 and the server 1 and the distributing device 2 and the distributing device 2 and the terminal device 3 are connected respectively by communication lines.

The server 1 stores plural kinds of data such as video works of movies, etc. , sound works of music, etc. , programs or the like.

The distributing device 2 is provided with a storing section 27a for storing parts of data stored by the server 1. The distributing device 2 further includes a server side transmitting/receiving section 2a, a terminal side transmitting/receiving section 2b, a storage control section 2c and information managing sections 2d and 2f.

The server side transmitting/receiving section 2a transmits/receives information to and from the server 1. More in detail, the server side transmitting/receiving means 2a transmits data provision requests from users to the server 1 and received new data sent therefrom.

The terminal side transmitting/receiving section 2b transmits/receives information to and from the terminal device 3.

The storage control section 2c reads data desired by users from the storing section 27a and writes new data received from the server 1.

The state control section 2 identifies whether provision requests have been received from the terminal device 3 or not and whether data are currently being sent thereto or not and monitors loads on the distributing device 2.

At the embodiment 1 according to the present invention, category codes for identifying individual data are added to information transmitted and received among the server 1, the distributing device 2 and the terminal device 3. The distributing device is further provided with an information managing section 2f and a category identification reference table(not shown in the Figure).

The category identification reference table is for registering identification information used to identify whether data belonging to each category should be stored in the storing section 27a or not at every category codes.

The information managing section 2f will detect the category codes of the respective new data and consult the category code identification reference table when a plurality of new data are simultaneously sent from the server 1. Then, by consulting the identification information of the category codes of the respective new data it will identify which data should be stored. When identifying the new data to be stored, the information managing section 2f will transfer them to the storage control section 2c. At this time, the storage control section 2c will write the new data in the storing section 27a.

As for identification information, it is to be preset.

The function and the effect of the file server will be described hereinbelow.

The user will input a command specifying desired data to the terminal device 3 when wishing to obtain them.

The terminal device 3 sends a request of desired data provision made by the user to the distributing device 2.

The terminal side transmitting/receiving section 2b at the distributing device 2, upon receiving the request, will sent it to the storage control section 2c.

The storage control section 2c retrieves the data in the storing section 27a and identifies whether there are data as requested stored or not. If there are requested data stored in the storing section 27a, the storage control section 2c will read the data therefrom and transfer them to the terminal side transmitting/receiving section 2b.

The terminal side transmitting/receiving section 2b sends the data received from the storage control section 2c to the terminal device 3.

In this way, it will be possible to obtain data without putting any loads on the server 1.

On the other hand, in the case where there are no data as requested stored in the storing section 27a, the storage control section 2c will report the data provision request from the terminal device 3 to the server side transmitting/receiving section 2a.

The server side transmitting/receiving section 2a will send the request to the server 1.

Upon receiving the request from the distributing device 2, the server will read the data corresponding to this request and send them thereto.

The server side transmitting/receiving section 2a at the distributing device 2, when receiving the data from the server 1, will transfer these data to the storage control section 2c and the terminal side transmitting/receiving section 2b.

The storage control section 2c writes the data into the storing section 27a.

Also, the terminal side transmitting/receiving section 2b sends the data to the terminal device 3.

Further, when identifying that loads on the distributing device 2 is small, the state control section 2d at the distributing device 2 will start the server side transmitting/receiving section 2a and send the request of new data provision to the server 1.

Then, when the new data are sent from the server 1, the information managing section 2f at the distributing device 2 will detect the category codes of the respective new data. Then, the information managing section 2f will identify whether the new data should be stored or not respectively consulting the category identification reference table. The information managing section 2f will transfer only the new data to be stored to the storage control section 2c. The storage control section 2c, upon receiving the new data from the information managing section 2f, will write them into the storing section 27a.

In this way, it will be possible to obtain desired new data when loads on the distributing device 2 is small.

EMBODIMENT 2

Figure 2:
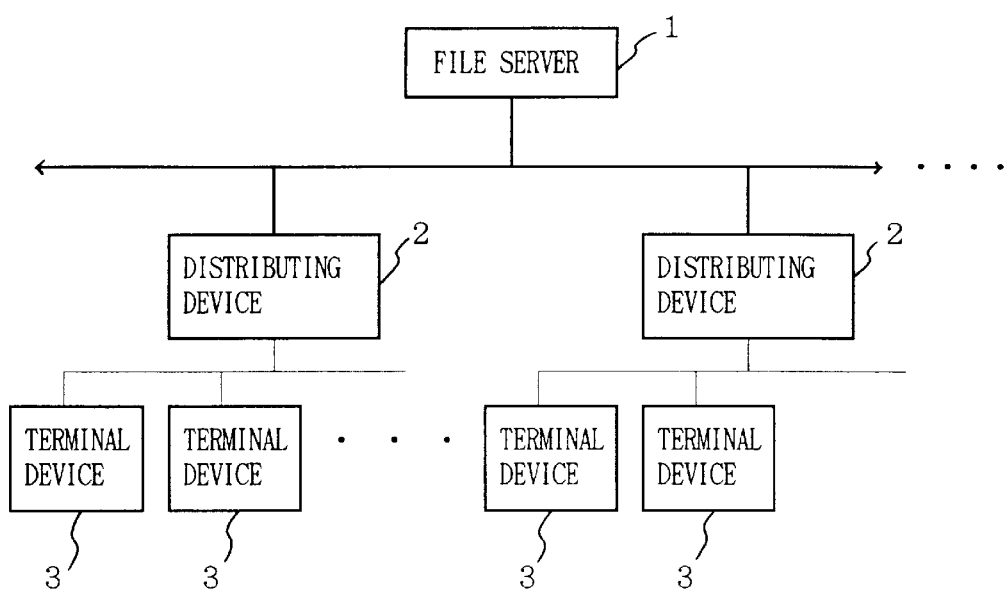
FIG. 2 is a view showing the whole construction of a file server at the embodiment 1.

The whole construction of the file server at the embodiment 2 will be shown in FIG. 2.

The file server is constructed by connecting a server 1 and a plurality of distribution devices 2 by communication lines and connecting the respective distributing devices 2 and a plurality of terminal devices 3. At this embodiment a case where a plurality of distributing devices 2 are connected to a single server 1 is taken as an example. However, the cases where the respective distributing devices 2 are connected to a plurality of servers 1 may be possible.

The server 1 is the device for holding a plurality of data such as video works, sound works, or the ones assembling these and providing data desired by users.

The distributing device 2 is for distributing data provided by the server 1 to a plurality of terminal devices 3. The distributing device 2 is provided with a storing device(an outside storing device and ROM25) for storing data up to a specified value and a function for reading the data desired by the users from the storing device when they are stored therein and sending them to the terminal devices 3 and transferring the users'requests to the server 1 when the data desired by the users are not stored.

The terminal device 3 is the one for sending the users' requests of desired data provision to the distributing device 2 and outputting the data received from the distributing device 2 in image or sound forms. It is a personal computer, etc., provided with, for example, output devices such as a CRT, a speaker and so on and such input devices as a keyboard and so on.

The construction and function of each device will be described hereinbelow.

<HARDWARE CONSTRUCTION OF THE SERVER 1>

Figure 3:
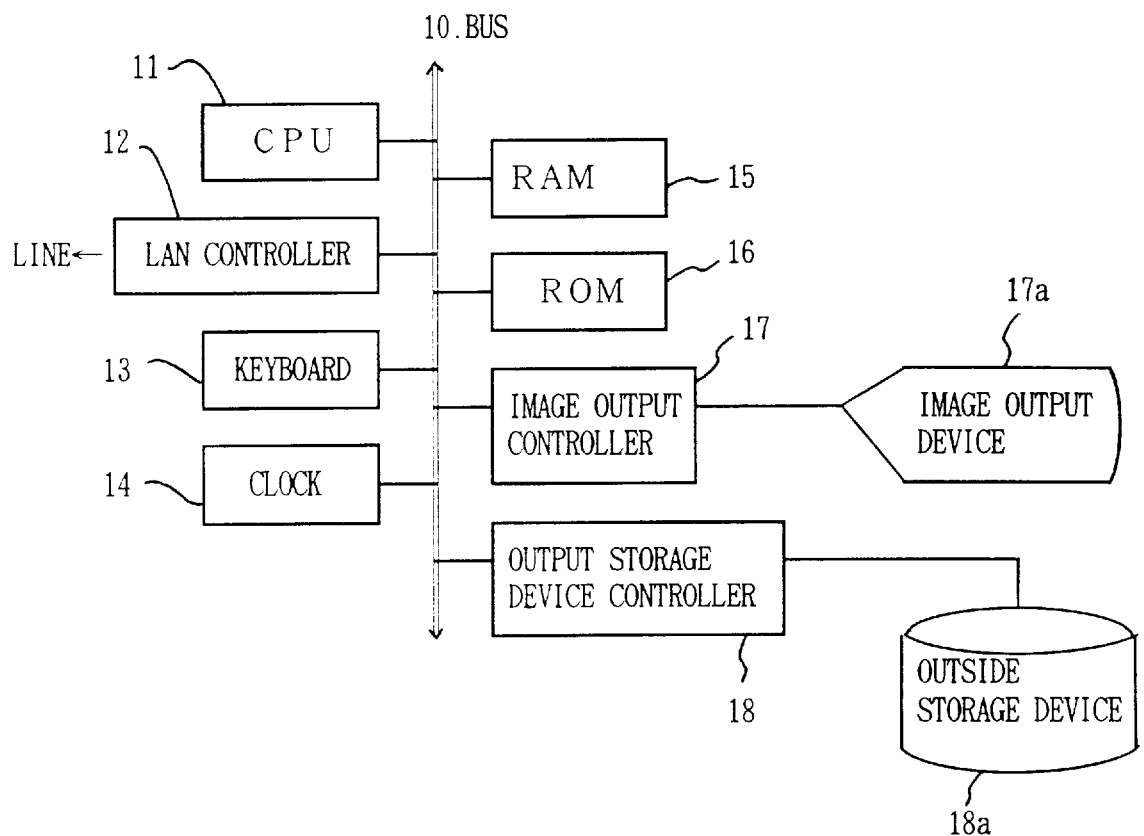
FIG. 3 is a view showing the hardware construction of a server at the embodiment 2.

As shown in FIG. 3, the server 1 is constructed by connecting a CPU 11, a RAM 15, a ROM 16, a keyboard 13, a LAN controller 12, an outside storing device controller 18, image output controller 17 and a clock by a bus 10.

Further, an outside storing device 18a such as a magnetic disk, an optical disk or the like is connected to the outside storing device controller 18 while an image output device 17a such as a CRT or the like is connected to the image output controller 17.

The outside storing device 18a stores data such as video works of movies, etc., or sound works of music, etc., and programs from controlling the CPU11.

The CPU 11 operates in accordance with the control programs stored in the ROM 16 and the outside storing device 18a and controls the LAN controller 12, the image output controller 17 and the outside storing device controller 18. Thus, the server 1 can execute such communication processings as data reading/writing, communications with the other servers, communications with the data distributing device 2 or the like.

The LAN controller 12 is the device for executing communications with the other servers and communications with the distributing device 2. As for the communication lines for connecting the server 1, the distributing device 2 and the terminal 3, lines such as ISDN and so on are used and the LAN controller 12 must be provided with communication boards or cards corresponding to the communication lines.

The keyboard 13 is the device for inputting data and commands done by the owner of the server 1. For example, when new data held by the other servers or new data stored in the outside storing devices (not shown in the Figure) are registered in the outside storing device 18a, the owner will input commands specifying the new data from the keyboard 13. Accordingly, the CPU will receive the new data from the other servers or read the outside storing devices and register them in the outside storing device 18a.

The specific function of the server 1 at the embodiment 2 will be described hereinbelow.

<FUNCTION OF THE SERVER 1>

FIG. 4 is a block diagram showing the functional construction of the server 1, and functions shown in this Figure are realized by the hardware described above.

The server 1 includes a transmitting/receiving section 1a, an information reading section 1b and a writing section 1c.

The transmitting/receiving section 1a is for communicating with the other servers and with the distributing device 2 by controlling the LAN controller. More in detail, it sends (1) new data requests to the other servers 1, (2) receives new data requests sent from the other servers, (3) receives new data sent from the other servers, (4) sends new data to the other servers, (5) receives data requests sent from the distributing device 2 and (6) sends data to the distributing device 2.

The information reading section 1b is for reading data stored in the outside storing device 18a by starting the outside storing device controller 18 and reading data stored in the RAM 15.

The writing section 1c is provided with a function for writing new data received by the transmitting/receiving section 1a into the outside storing device 1e or into the RAM 15.

Next, the construction and the function of the distributing device 2 at the embodiment 2 will be described.

<HARDWARE CONSTRUCTION OF THE DISTRIBUTING DEVICE 2>

Figure 5:
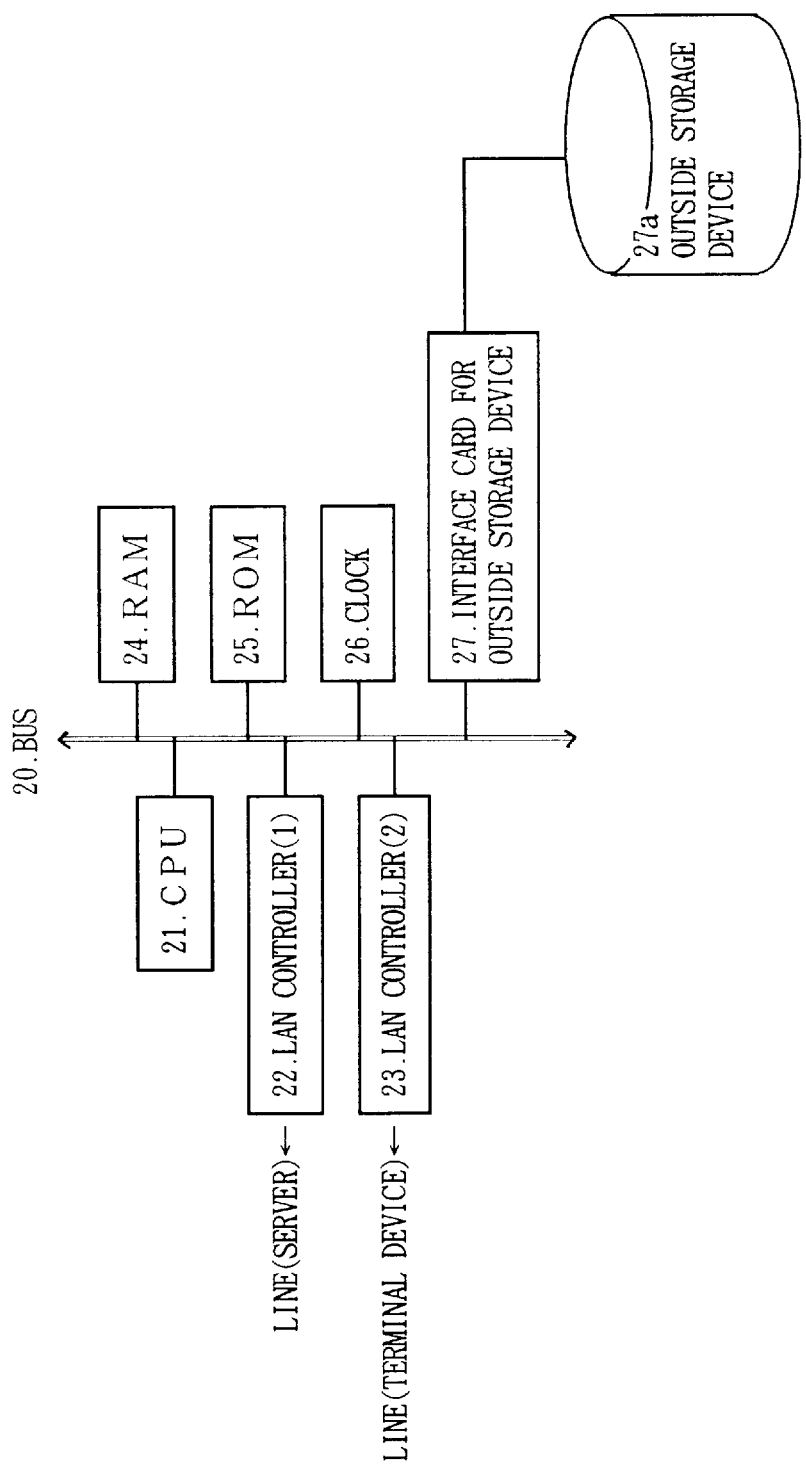
FIG. 5 is a view showing the hardware construction of a distributing device at the embodiment 2.

The hardware construction of the distributing device 2 at the embodiment 2 will be shown in FIG. 5.

In this Figure, the distributing device 2 is constructed by connecting a CPU 21, a LAN controller(1) 22, a LAN controller(2) 23, a RAM 24, a ROM 25, a clock 26 and an outside storing device interface card 27 by a bus 20.

Further, an outside storing device 27a of a magnetic disk, an optical disk, etc., is connected to the outside storing device interface card 27.

The outside storing device 27a is for registering data received from the server 1.

The CPU 21 operates in accordance with control programs stored in the ROM 25 or the outside storing device 27a and controls the operations of the LAN controller(1) 22, the LAN controller(2) 23 and the outside storing device interface card 27.

The LAN controller(1) 22 is for communicating with the server 1.

The LAN controller(2) 23 is for communicating with the terminal device 3.

The outside storing device interface card 27 is for interfacing between its own distributing device 2 and the outside storing device 27a.

The function of the distributing device 2 realized by the hardware construction described above will be described hereinbelow.

<FUNCTION OF THE DISTRIBUTING DEVICE 2>

Figure 6:
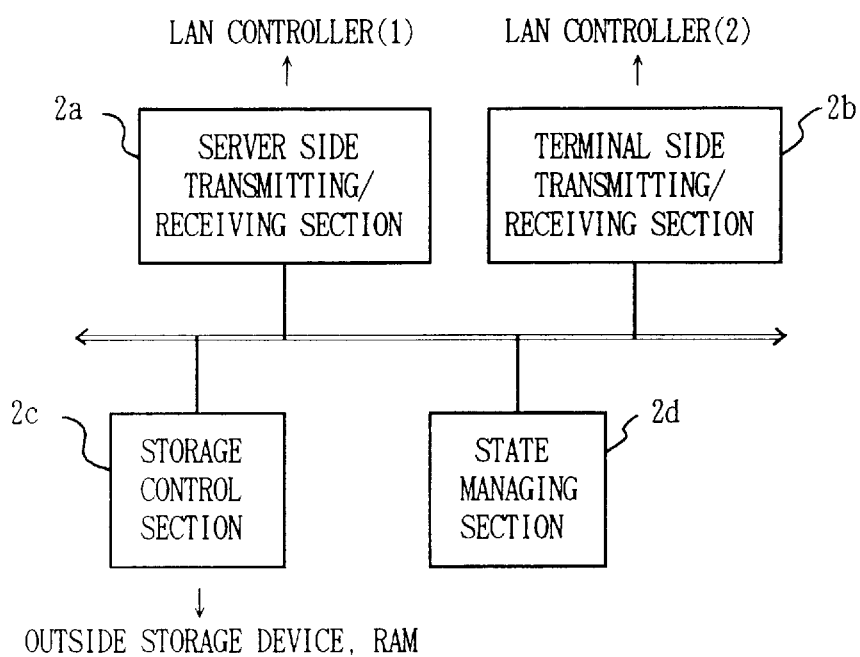
FIG. 6 is a block diagram showing the functional construction of a distributing device at the embodiment 2.

FIG. 6 shows the functional construction of the distributing device 2 at the embodiment 2.

The distributing device 2 includes a server side transmitting/receiving section 2a as a means of issuing provision requests according to the present invention, a terminal side transmitting/receiving section 2b as a receiving section, a state control section 2d and a storage control section 2c.

The server side transmitting/receiving section 2a is provided with a function for carrying out information sending and receiving operations with the server 1 controlling the LAN controller(1) 22. More in detail, it is provided with a function for transferring data requests from the terminal device 3 to the server 1 and the one for receiving data sent from therefrom.

The terminal side transmitting/receiving section 2b is provided with a function for carrying out information sending and receiving operations with the terminal device 3 by controlling the LAN controller(2) 23. More in detail, it is provided with a function for receiving data requests sent from the terminal device 3 and the one for sending data thereto.

The state control section 2d is for monitoring the operational state of the distributing device 2 of its own and provided with a function for identifying whether data requests from the terminal device 1 have been generated or not and whether data are currently being sent to the terminal device 1. If data requests have not been generated and no data are currently being sent, the distributing device 2 can send new data transfer requests to the server 1 itself and register new data received therefrom in the outside storing device 27a.

The storage control section 2c is for accessing to the outside storing device 27a via the outside storing device interface card 27 and provided with reading, writing and rewriting data. That is, when receiving data requests from the terminal device 3, it will retrieve data in the outside storing device 27a, read the desired data if they are stored and send them to the terminal device 3 via the terminal side transmitting/receiving section 2b. Conversely, if the desired data are not stored in the outside storing device 27a, it will send the data requests from the terminal device 3 to the server 1 via the server side transmitting/receiving section 2a. It is further provided with a function for storing the data in the outside storing device 27a and at the same time sending them to the terminal device 3 via the terminal side transmitting/receiving section 2b when receiving the data from the server 1.

<HARDWARE CONSTRUCTION OF THE TERMINAL DEVICE 3>

Figure 7:
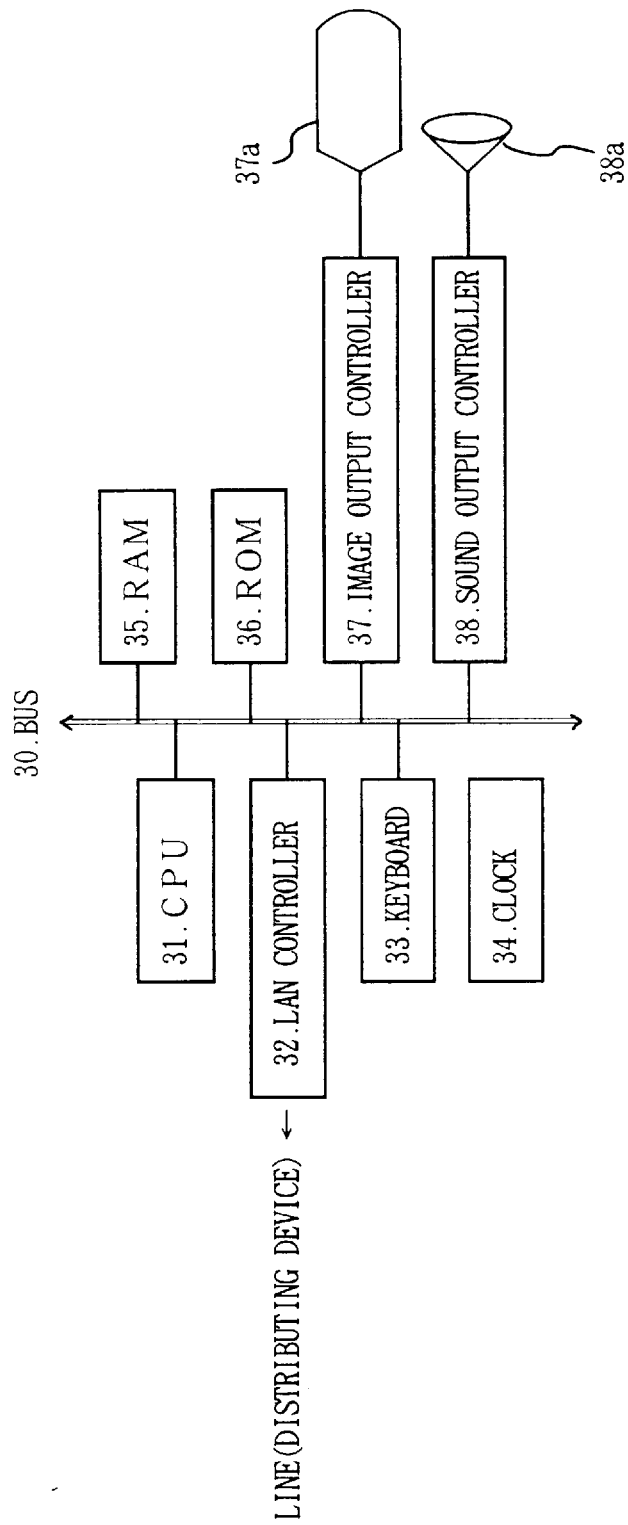
FIG. 7 is a view showing the hardware construction of a terminal device at the embodiment 2.

The hardware construction of the terminal device 3 at the embodiment 2 will be described with reference to FIG. 7.

The terminal device 3 is constructed by connecting a CPU 31, a LAN controller 32, a keyboard 33, a clock 34, a RAM 35, a ROM 36, an image output controller 37 and a sound output controller 38 by a, bus 30.

Further, an image output device of a CRT, etc., is connected to the image output controller 37 while a sound output device 38a is connected to the sound output controller 38.

The LAN controller 32 is for communicating with the distributing device 2.

The keyboard 33 is for inputting image data received from the distributing device 2 to the image output device 37a.

The sound output controller 38 is for outputting from the sound output device 38a sound data received from the distributing device 2.

The CPU 31 is for controlling the respective sections mentioned above in accordance with control programs stored in the ROM 36.

The functions of the terminal device 3 realized by the hardware construction described above will be described hereinbelow.

<FUNCTION OF THE TERMINAL DEVICE 3>

FIG. 8 shows the functional construction realized by controlling the LAN controller 32, the image output controller 37 and the sound output controller 38 with the CPU in accordance with control programs in the ROM 36.

As showing in FIG. 8, the terminal device 3 is provided with a transmitting/receiving section 3a, an information output section 3b and an input section 3c.

The input section 3c is for inputting data requests via the keyboard 33.

The transmitting/receiving section 3a is for carrying out information sending and receiving operations with the distributing device 2 by controlling the LAN controller 32. More in detail, it is provided with a function for sending data requests input by the input section 3c to the distributing device 2 and the one for receiving data sent therefrom.

The information output section 3b is provided with a function for outputting data received by the transmitting/receiving section 3a via the image output controller 37 or the sound output controller 38.

<OPERATION OF THE FILE SERVER>

The operational steps of the file server at the embodiment 2 will be described herein below.

Figure 9:
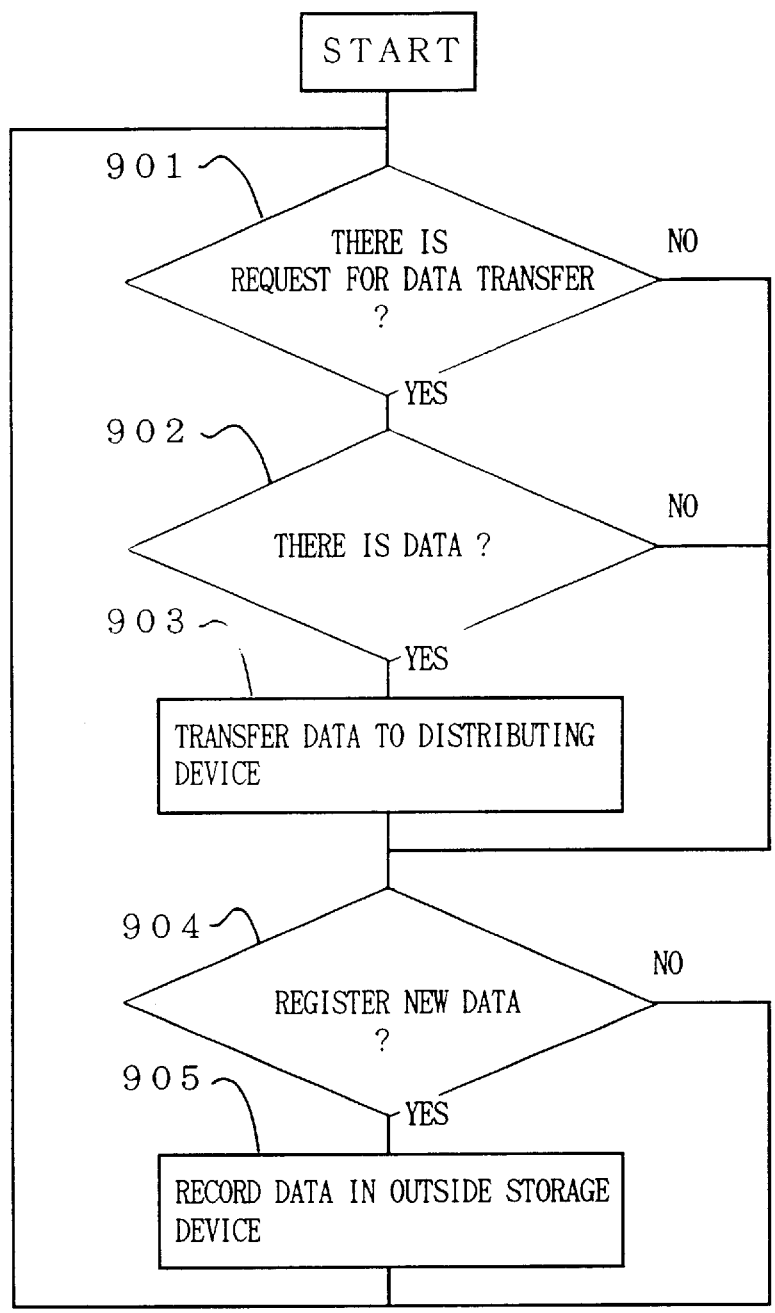
FIG. 9 is a flow chart showing the operation of a server at the embodiment 2.

FIG. 9 is a flow chart showing the operational steps of the server 1.

The transmitting/receiving section 1a of the server 1 is on standby for data transfer requests from the distributing device 2(step 901).

Here, when receiving data transfer requests, the transmitting/receiving section 1a will report them to the information reading section 1b.

The information reading section 1b will retrieve data in the outside storing device 18a based on the data transfer requests and identify registrations thereof(step 902).

If the requested data are registered in the outside storing device 18a, the information reading section 1b will read them and transfer them to the transmitting/receiving section 1a. The transmitting/receiving section 1a will transfer the data read by the information reading section 1b to the distributing device 2(903).

Further, when no data transfer requests have been received and no data are not currently been transferred, the server 1 will start the writing section 1c when commands specifying new data are input by the keyboard 13(step 904). When the specifying commands are input, the writing section 1c will read new data stored in the storage medium such as a magnetic disk, an optical disk or the like, or receive new data from the other servers 1 and write them in the outside storing device 18a(step 905).

Next, the operation of the distributing device 2 will be described.

Figure 10:
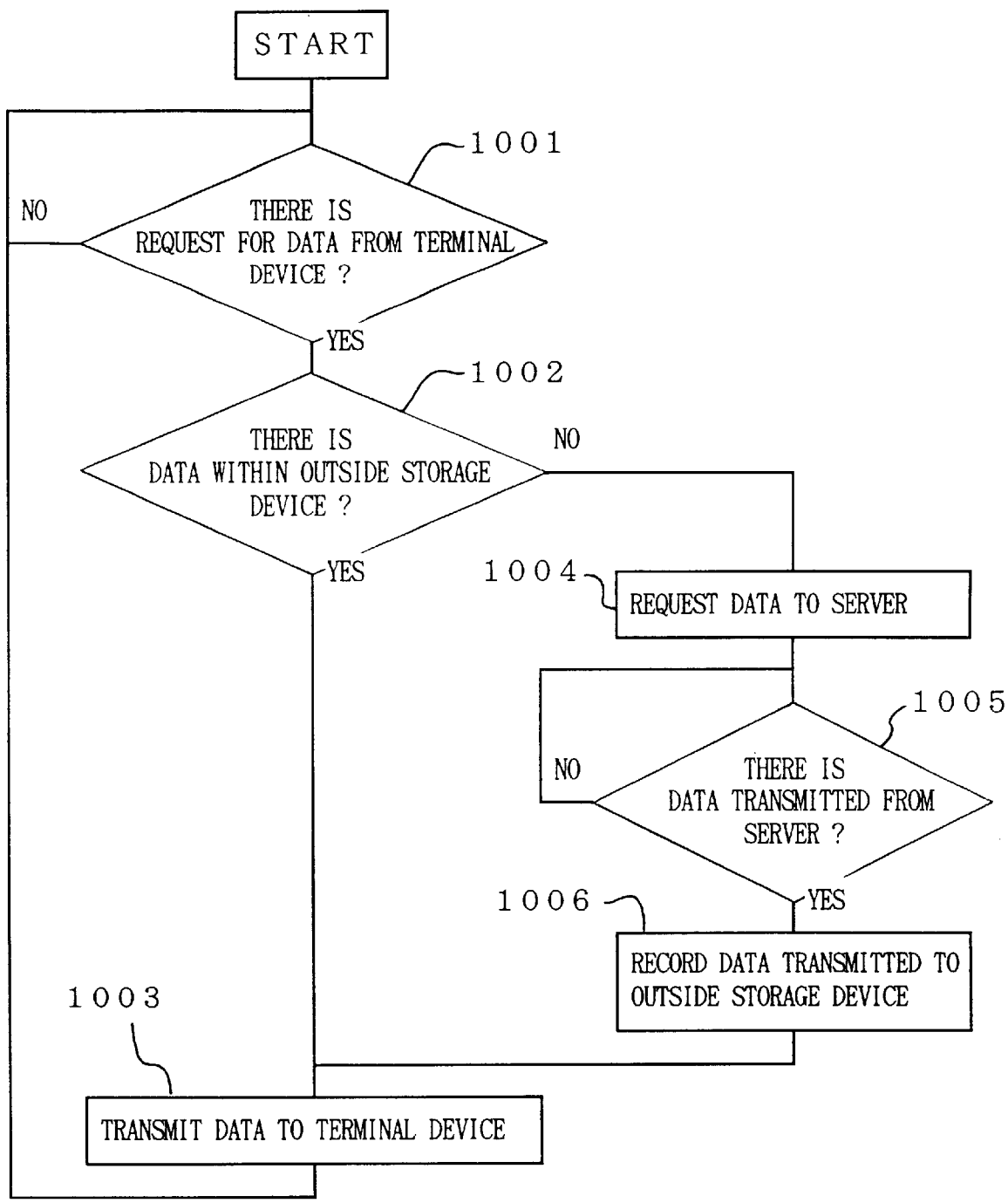
FIG. 10 is a flow chart showing the operation of a distributing device at the embodiment 2.

FIG. 10 is a flow chart showing the operational steps of the distributing device 2 at the embodiment 2.

When receiving data requests from the terminal device 3(1001), the terminal side transmitting/receiving section 2b at the distributing device 2 will report them to the storage control section 2c.

The storage control section 2c will retrieve data in the outside storing device 27a based on the data requests and identify storage thereof(step 1002).

Here, if the requested data are registered in the outside storing device 27a, the storage control section 2c will read the requested data and send them to the terminal device 3 via the terminal side transmitting/receiving section 2b(step 1003).

At the step 1002, in the case where the requested data have not been registered in the outside storing device 27a, the storage control section 2c will transfer the data requests from the terminal device 1 to the server 1 via the server side transmitting/receiving section 2a(step 1004). Then, the distributing device 2 will be placed on standby for data provision from the server 1(step 1005).

When the requested data are sent from the server 1, the server side transmitting/receiving section 2a will receive them and transfer them to the storage control section 2c. The storage control section 2c will write these data into the outside storing device 27a(step 1006) and at the same time send them to the terminal device 3 via the terminal side transmitting/receiving section 2b(step 1003).

Figure 11:
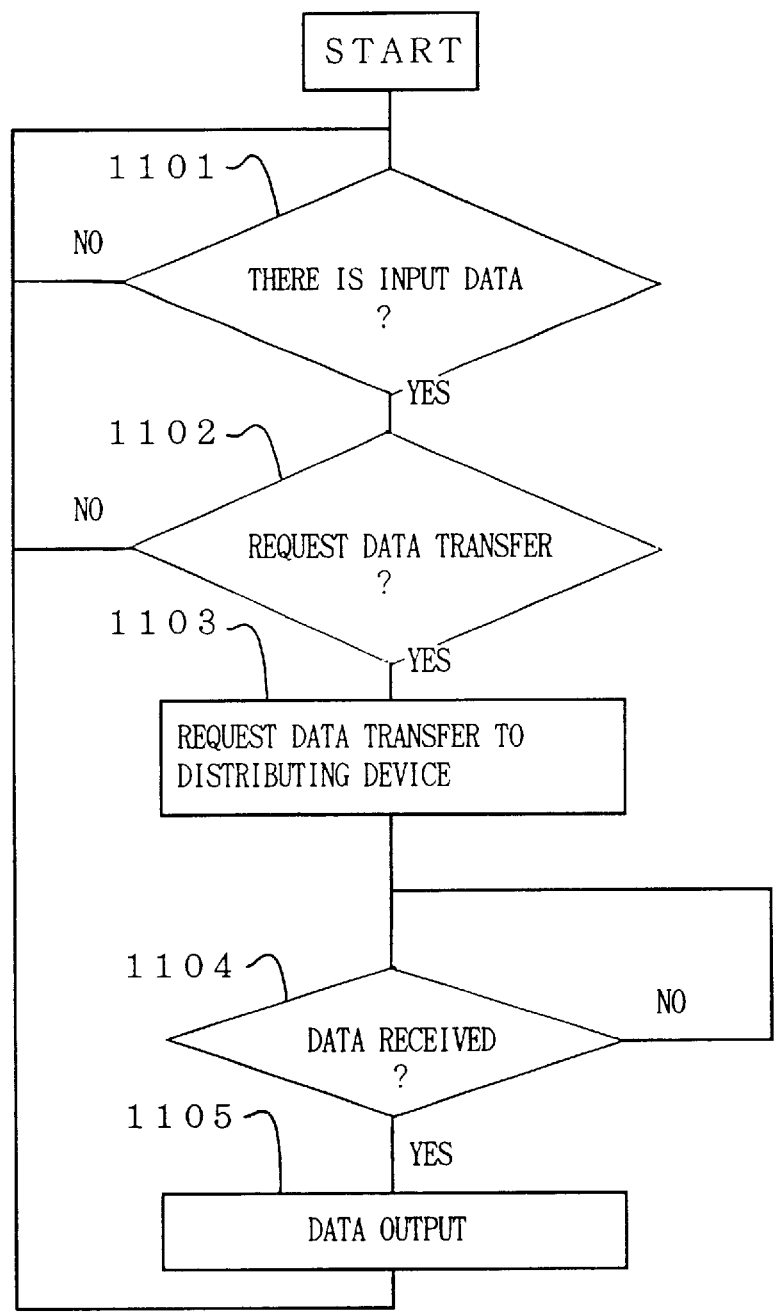
FIG. 11 is a flow chart showing the operation of a terminal device at the embodiment 2.

FIG. 11 is a flow chart showing the operation of the terminal device 3 at the embodiment 2.

The input section 3c monitors information input from the keyboard 33 and identifies whether it has been input or not(step 1101).

Here, when information is input from the keyboard 33, the input section 3c will analyze it and identify if it is data request(step 1102).

In the case where information input from the keyboard 33 is for requesting data, the transmitting/receiving section 3a will send the data requests to the distributing device 2(step 1103).

Then, when the terminal device 3 which is on standby for data from the distributing device 2 receives data therefrom (step 1104), the information output section 3b will output the data from the image output device 37a or the sound output device 38a(step 1105).

Next, the information storing operation of the distributing device 2 will be described with reference to FIG. 12.

The state control section 2d at the distributing device 2 identifies whether data requests from the terminal device 1 have been generated or not(step 1201). Here, if data requests have been generated, a data transfer processing as shown in FIG. 10 will be executed(step 1202).

On the other hand, at the step 1201, if there are not data requests generated, the state control section 2d will identify whether the distributing device 2 of its own is currently operating data transfer to the terminal device 1 or not(step 1203). Here, if there is no data transfer being operated, the server side transmitting/receiving section 2a will send new data transfer requests to the server 1(step 1204).

Then, the distributing device 2 which had been on standby for data from the server 1(step 1205), when receiving new data therefrom, will receive them at the server side transmitting/receiving section 2a and transfer them to the storage control section 2d.

The storage control section 2d will write the new data thus received to the outside storing device 27a(step 1206).

<EFFECT OF THE EMBODIMENT 2 >

According to the embodiment 2, as the file server stores data requested by the terminal device in the distributing device once, data to be transmitted from the server to the terminal device can be provided from the distributing device. Thus, the utilization rate of the communication lines connecting the server and the distributing device can be reduced and processing loads on the server can be reduced, as well. Therefore, in the case where a number of terminal devices are connected to a single server, it will be possible to provide information to the respective terminal devices at a high speed.

Also, prior to operation of the file server, the utilization rate of the communication lines can be further reduced by registering parts of data held by the server in the distributing device. Moreover, parts of the data held by the server may be registered in a changeable type storage medium such as a CD-ROM or the like which is provided to the distributing device beforehand.

In the description of the embodiment 2, reference was not made to data forms to be sent and received amount the devices. However, the server may be made to hold data in a compressed state, send the data in this state to the distributing device and provide them to the terminal device after they are given expansion processing at the distributing device. Or, the data in the compressed state may be sent from the distributing device to the terminal device and expanded thereat. In this way, it will be made possible to reduce the amount of data sent on the communication lines and to reduce the utilization rate thereof.

Further, in the case where it is necessary to charge for data requested by the users, user charging information will be sent from the terminal device to the distributing device just before or after data transmission and the distributing device will send the information singly or in a compressed form to the server. The server may store the charging information in the outside storing device and carry out charging processings when necessary.

Furthermore, as the distributing device can obtain data from the server when no transmission processings or receiving processings are not currently operated, loads on the CPU are small and some communication lines are available, the amount of communications between the distributing device and the server can be reduced at the time of data requests from the terminal device. Thus, even if the same data are requested by a number of terminals, as the data can be provided from the respective distributing devices to the terminal devices, high-speed data transfer will be made possible.

EMBODIMENT 3

The whole construction of a file server at the embodiment 3 is similar to the one at the embodiment 1 including a server 1, a distributing device 2 and terminal device 3.

<HARDWARE CONSTRUCTION OF THE SERVER 1>

Figure 13:
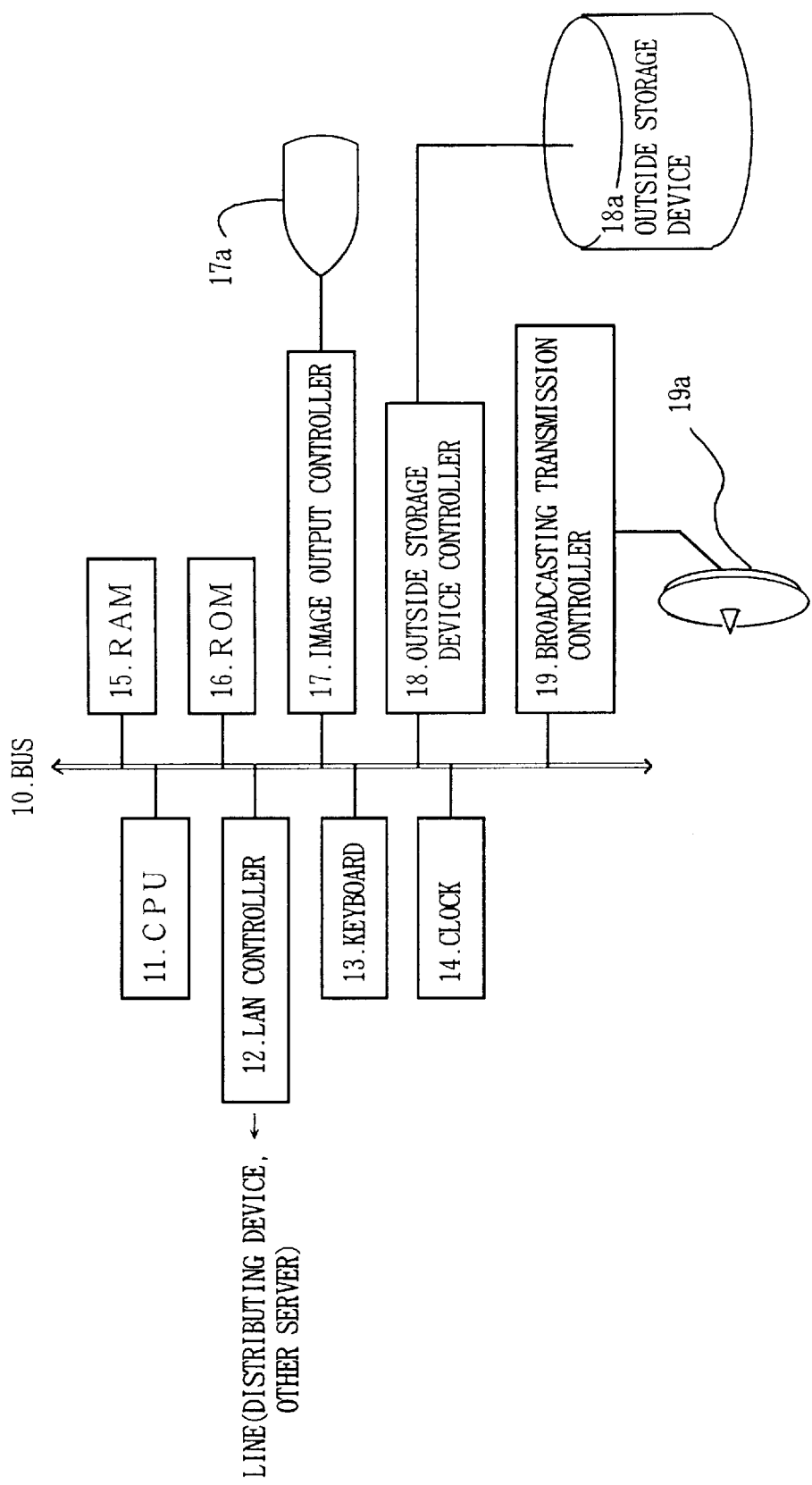
FIG. 13 is a view showing the hardware construction of a server at the embodiment 3.

The hardware construction of the server 1 will be shown in FIG. 13.

This server 1 is provided, in addition to the ones at the embodiment 1, a transmitter 19a for sending data by radio and a broadcast transmission controller 19 for controlling data transmission from this transmitter 19a.

The other parts of the construction are the same as the one at the embodiment 1, and thus their explanation will be omitted.

<FUNCTION OF THE SERVER 1>

Figure 14:
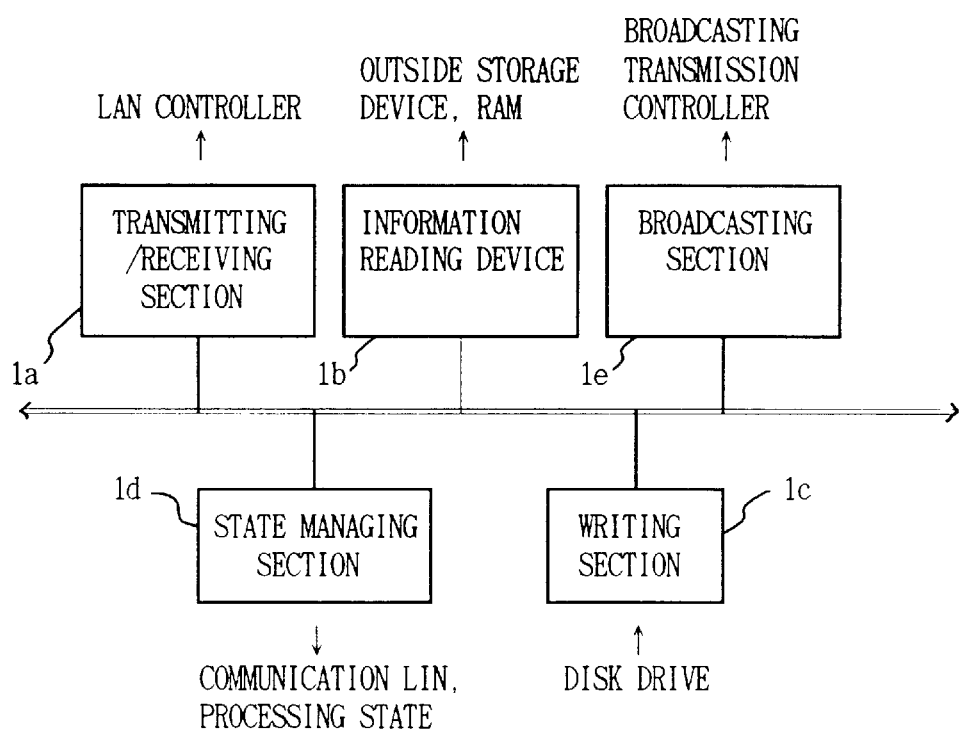
FIG. 14 is a block diagram showing the functional construction of a server at the embodiment 3.

FIG. 14 is a block diagram showing the functional construction of the server 1 realized by the hardware construction mentioned above.

The server at the embodiment 3 is provided, in addition to the ones at the embodiment 1, with a state control section 1d and a broadcasting section 1e.

The broadcasting section 1e is provided with a function for controlling the broadcast transmission controller 19 and transmitting data simultaneously to all distributing devices 2.

The state control section 1d is provided with a monitor for monitoring the processing state of the server 1 and identifying whether data are currently being provided to the distributing device 2 and a line monitor for monitoring the utilization band of communication lines connected to the distributing device 2. Depending on the detection results of the respective monitors, if data are not currently being sent and some communication lines are available, the server 1 will start the information reading section 1b and the transmitting/receiving section 1a and send new data newly registered in the outside storing device to all the distributing devices 2. Conversely, if the server 1 is not engaged with data transfer and there are only small bands of the communication lines available, the broadcasting section 1e will be started and the new data will be sent to all the distributing devices 2.

Here, it is assumed that the transmitting/receiving section 1a is provided with a function for simultaneously sending the same data to a plurality of distributing devices 2. The other functions are similar to those at the embodiment 1, and thus their explanations will be omitted.

Next, the distributing device 2 at the embodiment 3 will be described.

<HARDWARE CONSTRUCTION OF THE DISTRIBUTING DEVICE 2>

Figure 15:
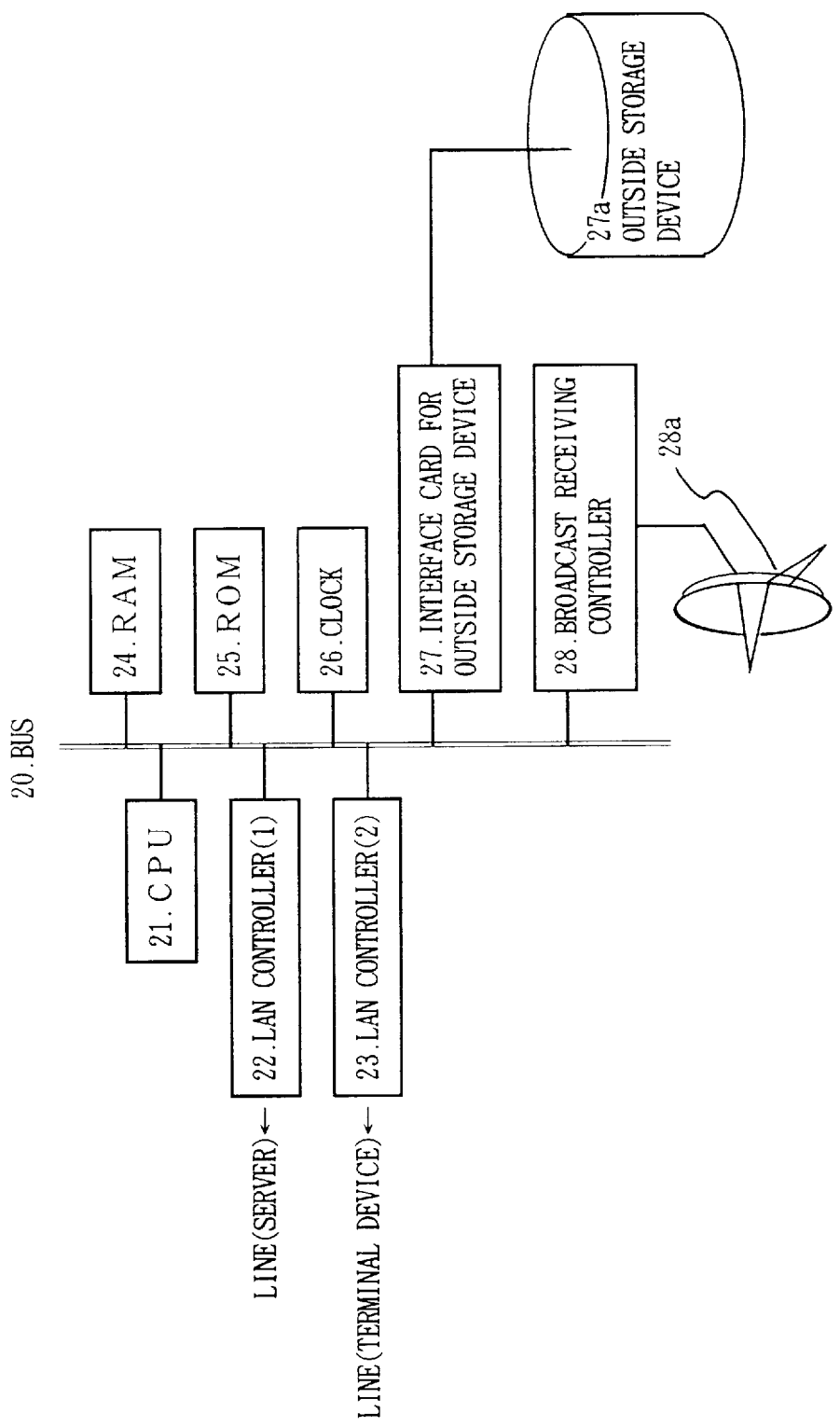
FIG. 15 is a view showing the hardware construction of a distributing device at the embodiment 3.

The hardware construction of the distributing device at the embodiment 3 is shown in FIG. 15.

The distributing device 2 is provided, in addition to the ones at the embodiment 1, with a receiver 28a for receiving data sent by radio from the server 1 and a broadcast receiving controller 28 for transforming data received by this receiver 28a into data changeable by the distributing device 2 and inputting them. The other parts of the construction are the same as those at the embodiment 1, and thus their explanations will be omitted.

The functions of the distributing device 2 realized by the hardware construction mentioned above will be described hereinbelow.

<FUNCTION OF THE DISTRIBUTING DEVICE 2>

Figure 16:
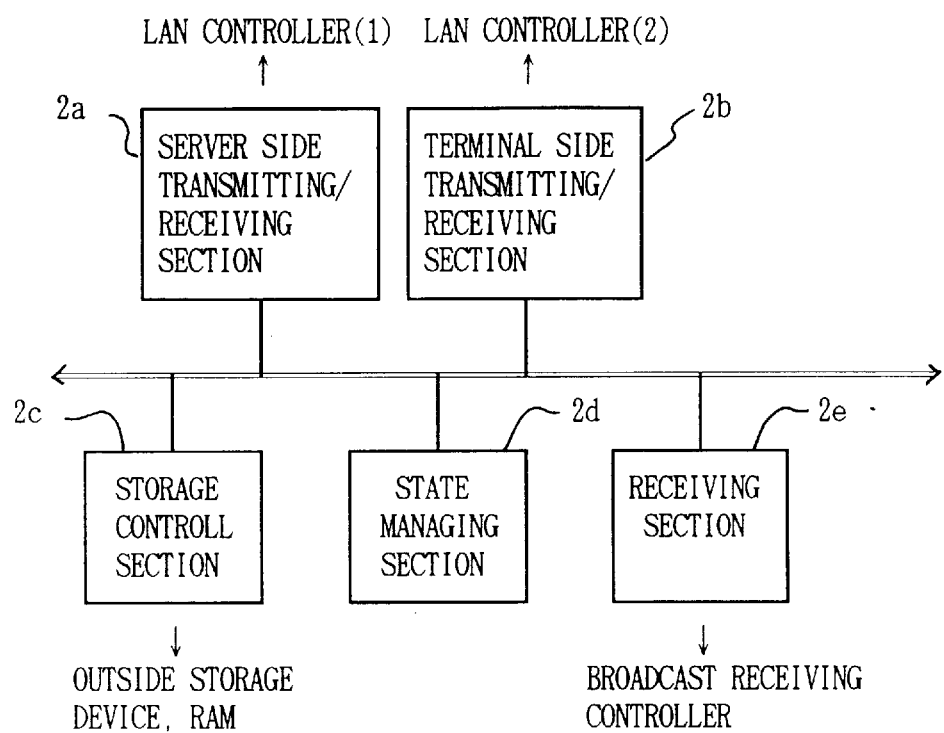
FIG. 16 is a block diagram showing the functional construction of a distributing device at the embodiment 3.

The functions of the distributing device 2 will be described with reference to FIG. 16.

The distributing device 2 includes a receiving section 2e in addition to those at the embodiment 1. This receiving section 2e is provided with a function for controlling the broadcast receiving controller 28 and receiving data sent from the server 1. When receiving data from the server 1, the receiving section 2e will transfer the data to the storage control section 2c. The storage control section 2c will write the data received by the receiving section 2e into the outside storing device 27a via the outside storing device interface card 27.

The other functions are similar to those at the embodiment 1, and thus their explanations will be omitted.

Also, the construction and the function of the terminal device 3 are similar to those at the embodiment 1, and thus their explanations will be omitted.

<OPERATION OF THE FILE SERVER>

The operation of the file server at the embodiment 3 will be described with reference to the Figures.

First, the operation of the server 1 will be described with reference to FIG. 17.

The transmitting/receiving section 1a at the server 1 is on standby for data transfer requests from the distributing device 2(step 1701).

When there are no data transfer requests from the distributing device 2 for a certain period of time, the state control section 1d will detect the utilization amounts of respective communication lines connected to the distributing device (step 1702).

When the utilization amounts of the communication lines are small, that is, in the case where there are still some communication lines available, the information reading section 1b will be started when commands specifying new data to be transferred are input from the keyboard 13.

The information reading section 1b will access to the outside storing device 17a and read the new data in accordance with the specifying commands(step 1703). Then, the information reading section 1b will transfer the new data which have been read.

The transmitting/receiving section 1a will control the LAN controller 12 and simultaneously send the new data to all the distributing devices 2(step 1704).

At the step 1701 previously mentioned, when the transmitting/receiving section 1a receives data transfer requests(step 1707), the information reading section 1b will retrieve data in the outside storing device 17a, identify registration of the requested, and if they have been registered it will report the requested data to the transmitting/receiving section 1a.

The transmitting/receiving section 1a will send the data read by the reading section 1b to the data request originating distributing device 2(step 1704).

Also, at the step 1702, in the case where the utilization rate of the communications lines is high, the broadcasting section 1e will be started and the new data will be sent to all the distributing devices by radio(step 1708).

Further, when there are no data transfer requests at the step 1701 and the users input commands for registering new data to the outside storing device 17a without inputting transfer commands of the new data even if the utilization rate of the communication lines is identified to be low at the step 1702(step 1705), the writing section 1c will be started. When the registering commands are input, the writing section 1c will read new data stored in the storage medium such as a magnetic disk, an optical disk or the like, or receive new data from the other server 1 and write them in the outside storing device 18a(step 1706).

Next, the operation of the distributing device 2 will be described.

Figure 18:
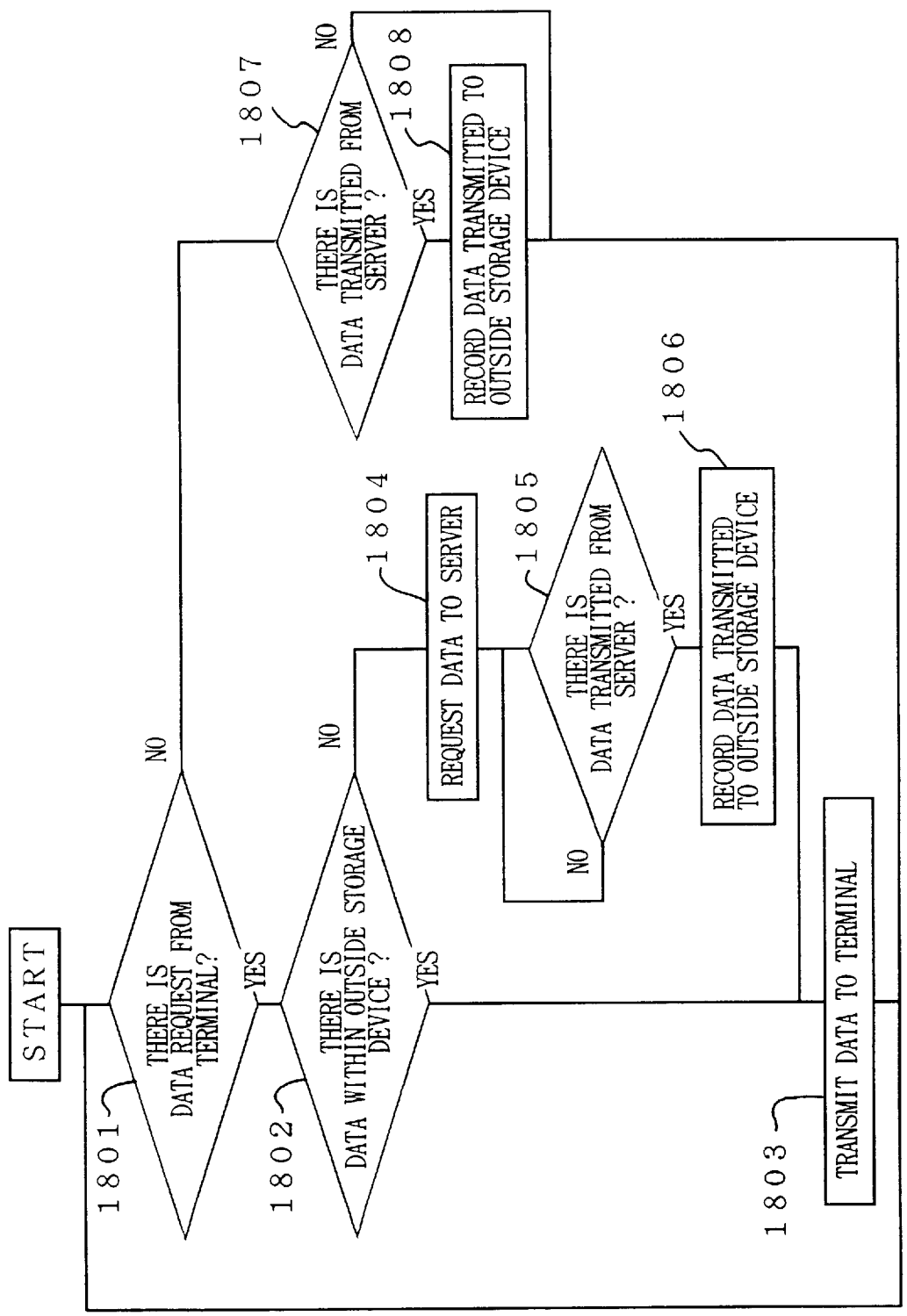
FIG. 18 is a flow chart showing the operation of a distributing device at the embodiment 3.

FIG. 18 is a flow chart showing the operational steps of the distributing device 2 at the embodiment 3.

The terminal side transmitting/receiving section 2b at the distributing device 2 is on standby for data requests from the terminal device 3(step 1801), and when receiving the data requests it will report them to the storage control section 2c.

The storage control section 2c will retrieve data in the outside storing device 27a based on the data requests and identify their storage(step 1802).

Here, in the case where the requested data have been registered in the outside storing device 27a, the storage control section 2c will read the requested data and send them to the terminal device 3 via the terminal side transmitting/receiving section 2b(step 1803).

Further, when there is no registration of the requested data in the outside storing device 27a at the step 1802, the storage control section 2c will transfer the data requests from the terminal device 1 to the server 1 via the server side transmitting/receiving section 2a(step 1804). Then, the distributing device 2 will be placed on standby for data provision from the server 1(step 1805).

When the requested data are sent from the server 1, the server side transmitting/receiving section 2a will receive them and transfer them to the storage control section 2c. The storage control section 2c will write the requested data in the outside storing device 27a(step 1806) and at the same time send them to the terminal device 3 via the terminal side transmitting/receiving section 2b(step 1803).

Further, when there are no data requests from the terminal device 3 at the step 1801 and new data are sent from the server 1 by the communication lines or radio(step 1807), these new data will be received by the server side transmitting/receiving section 2a or the receiving section 2e and transferred to the storage control section 2c.

The storage control section 2c will write the received new data into the outside storing section 27a(step 1808).

As the operation of the terminal device 3 at the embodiment 3 is similar to the one at the embodiment 1, its description will be omitted.

<EFFECT OF THE EMBODIMENT 3>

According to the file server at the embodiment 3, prior to data requests from the terminal device data can be stored in the distributing device, and thus the amount of data communications between the server and the distributing device can be reduced at the time of data requests from the terminal device. Therefore, by distributing processing loads to the server and the distributing device it will be made possible to transfer data to the terminal device at a high speed. That is, the period of waiting time from data requests to obtaining of data can be reduced. Also, in the case where a number of terminal devices request the same data, it will be possible to transfer data at a high speed.

Further, by providing mechanisms for transmitting/receiving data by radio on the server and the distributing device, it will be made possible to supply data even when the utilization frequency of the communication lines is high and to reduce the utilization rate thereof.

EMBODIMENT 4

The server 1 at the embodiment 4 is made to send data, individual data names, category codes indicating the kinds of data and data lengths indicating the lengths of data when transmitting data to the distributing device 2 (see FIG. 19).

Accordingly, a category identification reference table as shown in FIG. 20 is registered in the ROM 25 of the distributing device 2 or the outside storing device 27a. This category identification reference table is for identifying data requested by a terminal device group 1 connected respectively to the distributing devices 2 and registering identification infirmation for every category code. This category identification reference table will be written in the RAM 24 from the ROM 25 or the outside storing device 27a when the distributing device 2 is started.

The function of the distributing device 2 realized by the construction mentioned above will be described hereinbelow.

<FUNCTION OF THE DISTRIBUTING DEVICE 2>

The distributing device 2 is provided, in addition to those shown at the embodiment 3, with an information managing section 2f.

The information managing section 2f is to be started when new data are simultaneously sent from the server 1 to all the distributing devices 2, and it is for detecting the category codes of the data received from the server 1, retrieving the category identification reference table based on these category codes and consulting the identification information of the category codes. It is provided with a function for transferring the new data to the storage control section 2c and registering them in the outside storing device 27a if the data are the ones as requested by the terminal device group 1.

For example, in the case where data (1) is received as shown in FIG. 22, the information managing section 2f will detect the category code "DOMESTIC NEWS" of this data (1) and consult the category identification reference table as shown in FIG. 20 based on this category code "DOMESTIC NEWS". As the identification information of the domestic news is "yes" in the category identification table, the storage control section 2c will write the data (1) into the outside storing device 27a.

Further, when receiving the data (2) as shown in FIG. 22, the information managing section 2f will detect a category code "OVERSEAS NEWS" from this data (2) and consult the category identification reference table as shown in FIG. 20 based on this category code "OVERSEAS NEWS". As the identification reference of the verses news is "no" in the category identification reference table, the storage control section 2c will erase the data (2) without writing it into the outside storing device 27a.

As the other functions are the same as those at the embodiment 3, their explanations will be omitted.

Also, as the functions of the server 1 and the terminal device 3 are similar to those at the embodiment 3, their explanations will be omitted.

The operation of the distributing device 2 at the embodiment 4 will be described hereinbelow.

<OPERATION OF THE DISTRIBUTING DEVICE 2>

Figure 23:
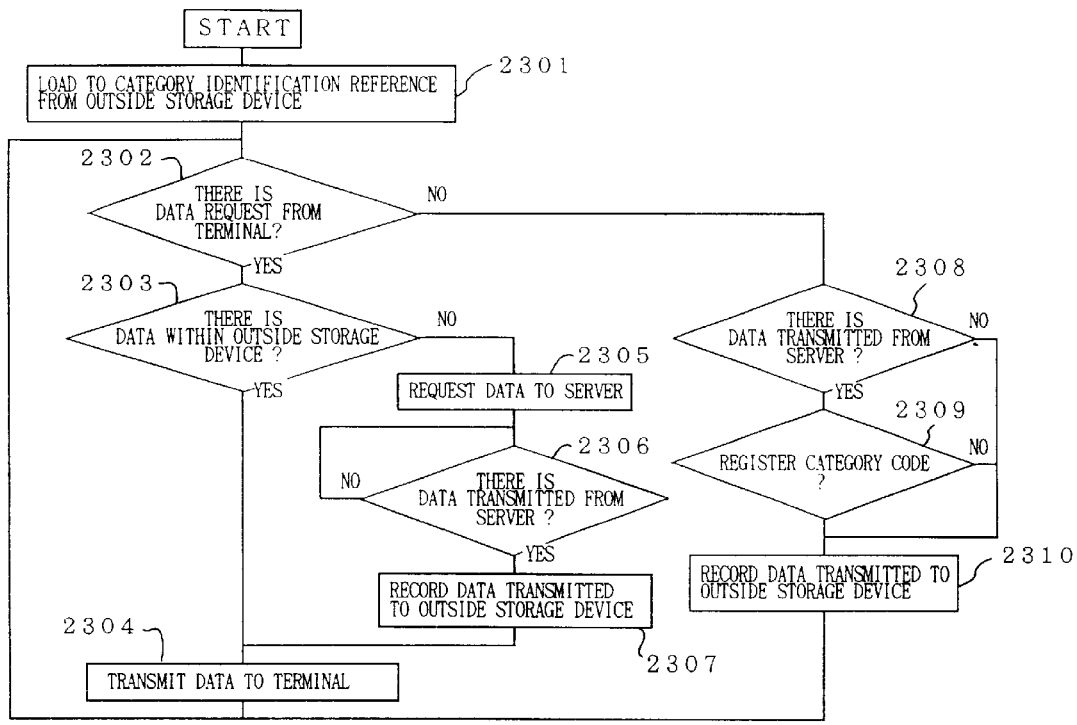
FIG. 23 is a flow chart showing the operation of a distributing device at the embodiment 4.

The operational flow chart of the distributing device 3 at the embodiment 4 is shown in FIG. 23.

The information managing section 2f at the distributing device 2 makes accessing to the outside storing device 27a at the time of starting the distributing device, reads the category identification reference table and loads to the RAM 24(step 2301).

Then, the terminal side transmitting/receiving section 2b will be placed on standby for data requests from the terminal device l(step 2302).

When the terminal side transmitting/receiving section 2b receives data requests, the storage control section 2c will retrieve the outside storing device 27a based on the data requests and identify storage thereof (step 2303).

If there are the requested data registered in the outside storing device 27a, the storage control section 2c will read the requested data and send them to the terminal device 3 via the terminal side transmitting/receiving section 2b(step 2304).

On the other hand, if the requested data have not been registered in the outside storing device 27a at the step 2303, the storage control section 2c will start the server side transmitting/receiving section 2a and send the requests asking for transfer of the requested data to the server 1(step 2305).

Then, when the server side transmitting/receiving section 2a receives the requested data from the server 1(step 2306), the storage control section 2c will write the requested data into the outside storing device 27a(step 2307) and send them to the terminal device 1 via the terminal side transmitting/receiving section 2b(step 2304).

Further, when there are no data requests at the step 2302 and when new data are sent from the server 1 by the communication lines or by radio(step 2308), these new data will be reported to the information managing section 2f.

The information managing section 2f will detect the category codes of the new data and make accessing to the category identification reference table of the RAM 24 based on these category codes. Then, it will identify whether the category indicated by these codes coincides with the one requested by the terminal device 3 or not(step 2308).

Here, in the case where the category of the new data coincides with the one requested by the terminal device 3, the information control section 2c will write the new data into the outside storing device 27a(step 2309).

<EFFECT OF THE EMBODIMENT 4>

According to the embodiment 4, by setting a category identification table for identifying categories of data requested by users for each distributing device, each distributing device will be allowed to register data as requested by the users beforehand.

Further, though the category identification reference table is used only at the time of simultaneous transmission of data from the server in the case of this embodiment 4, it is possible to identify categories of data requested by users. In this case, in the case where the categories of the data do not coincide with the identification information of the category identification reference table when the data as requested by the users are received from the server device, the data will not be sent to the users.

EMBODIMENT 5

The server 1 at the embodiment 5 is, as similar to the case at the embodiment 4, made to transmit data, names of the data, category codes and data length.

The distributing device 2 is provided with a category identification reference table for identifying whether data sent from the server 1 are the one belonging to a category requested by the terminal device or not.

This category identification reference table registers the number of requesting times from the terminal device 3 as identification information as different from the structure of the embodiment 4 (see FIG. 24). Further, this category identification reference table is not a fixed one as at the embodiment 4 but a dynamically changing one. That is, when data requested by the terminal device 3 is sent, the information managing section 2f will secure an area for the table on the outside storing device 27a and register the category code of the data and the number of requesting times "1". Thereafter, the processing will be repeated, and if the category code of the data to be transmitted to the terminal device 3 has already been registered in the category identification reference table, the information managing section 2f will increment the number of requesting times by "1".

Further, when receiving new data simultaneously sent from the server 1, the information managing section 2f will retrieve the category identification reference table on the RAM based on the category codes of these new data and identify whether the same category codes have already been registered or not. Here, it is provided with a function for starting the storage control section 2c and registering the new data in the outside storing section 27a if the same category codes have been registered.

On the other hand, the information managing section 2f is provided with a function for abolishing the new data if the same category codes have not been registered.

The operation of the distributing device 2 at the embodiment 5 will be described hereinbelow.

<OPERATION OF THE DISTRIBUTING DEVICE 2>

Figure 25:
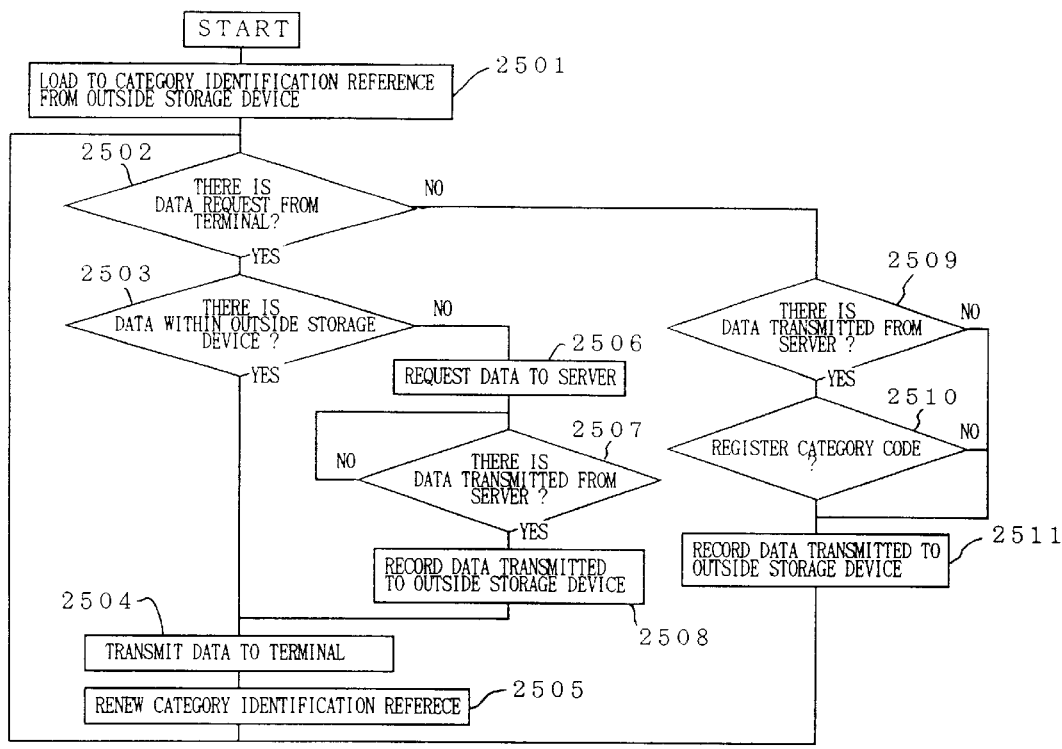
FIG. 25 is a flow chart showing the operation of a distributing device at the embodiment 5.

FIG. 25 is a flow chart showing the operational steps of the distributing device 2.

The information managing section 2f at the distributing device 2 makes accessing to the outside storing device 27a at the time of starting the distributing device 2 and loads the category identification reference table to the RAM 24(step 2501).

Then, the terminal side transmitting/receiving section 2b will be placed on standby for data requests from the terminal device 1(step 2502).

When the terminal side transmitting/receiving section 2b receives the data requests, the storage control section 2c will retrieve the outside storing device 27a based on the data requests and identify if they have been stored(step 2503).

If the requested data have been registered in the outside storing device 27a, the storage control section 2c will read the requested data and send them to the terminal device via the terminal side transmitting/receiving section 2b(step 2504).

On the other hand, if the requested data have not been registered in the outside storing device 27a at the step 2503, the storage control section 2c will start the server side transmitting/receiving section 2a and send the request asking for requested data transfer to the server 1(step 2506).

Then, when the server side transmitting/receiving section 2a receives the requested data from the server 1(step 2507), the storage control section 2c will write the requested data into the outside storing device 27a(step 2508) and send them to the terminal device 1 via the terminal side transmitting/receiving section 2b(step 2504).

When transmission of the requested data is completed at the step 2504, the information managing section 2f will detect the category codes of the requested data and renew the contents of the category identification table based on these category codes(step 2505).

Further, when there are no data requests at the step 2502 and when new data are sent from the server 1 by the communication lines or by radio(step 2509), these new data will be reported to the information managing section 2f.

The information managing section 2f will detect the category codes from the new data and make accessing to the category identification reference table on the RAM 24 based on these category codes. Then, it will identity whether they have already been registered or not(step 2510).

Here, if the categories of the new data have been registered, the information control section 2c will write the new data into the outside storing device 27a(step 2511).

Figure 26:
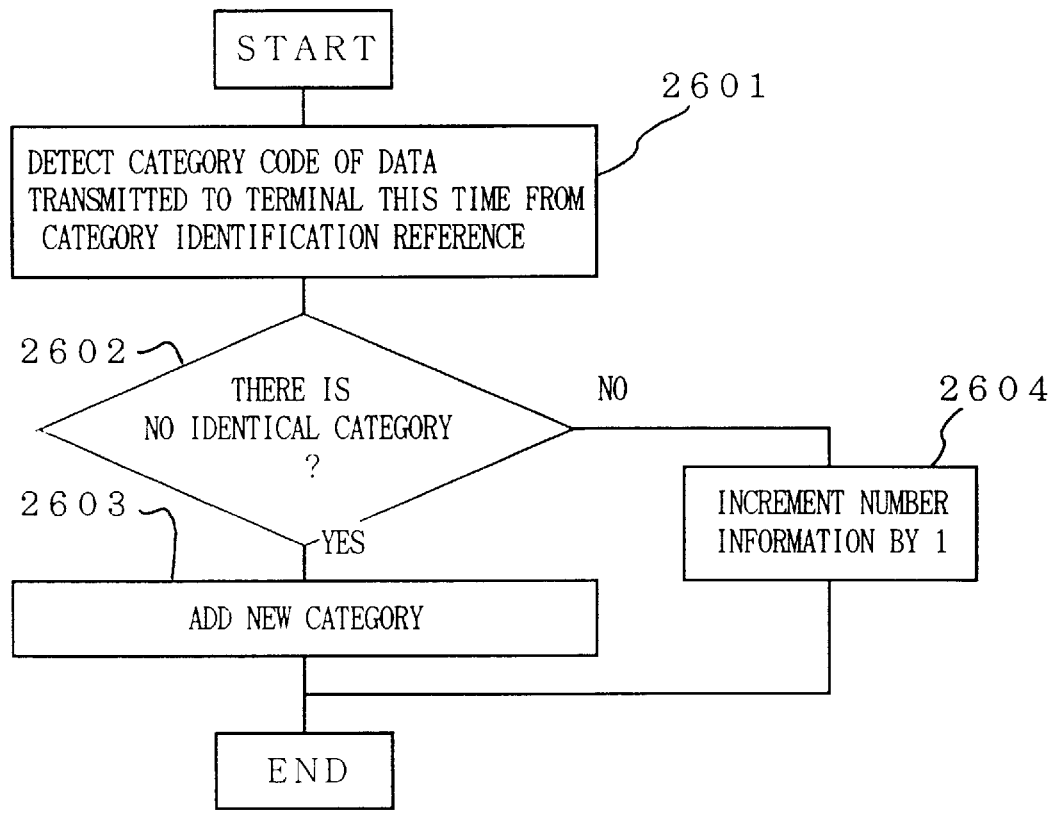
FIG. 26 is a flow chart showing category identification reference renewal.

The renewing operation at the step 2505 will be described with reference to the flow chart in FIG. 26.

The information managing section 2f will detect the category codes from the data when the data requested by the terminal device 3 are sent thereto(step 2601).

Then, the information managing section 2f will retrieve the category identification reference table on the RAM 24 and identify whether the category codes have been registered or not(step 2602).

Here, if the category codes have not been registered, the information managing section 2f will newly register them on the category identification reference table and at the same time register "1" as the number of requesting times for these category codes(step 2603).

On the other hand, if the category codes have been registered in the category identification reference table at the step 2602, the information managing section 2f will increment the number of requesting times for the category codes by "1"(step 2604).

<EFFECT OF THE EMBODIMENT 5>

According to the embodiment 5, in the case where a plurality of terminal devices are connected to the distributing device, by recording the requesting frequency for the category requested by each terminal device data corresponding to the user request history can be stored by the distributing device. Thus, it will be made possible to provide data requested by the users from the distributing device and to shorten the period of waiting time from data requests to data input needing only a minimum storage capacity of the outside storing device.

Further, by storing data groups desired by the users by the distributing device, it will be made possible to reduce the amount of communications between the server and the distributing device.

EMBODIMENT 6

At the embodiment 6, as similar to the case at the embodiment 4 or 5, data names, category codes and data lengths are added to data transmitted and received among a server 1, a distributing device 2 and a terminal device 3.

On the distributing device 2 at the embodiment 6, as similar to the embodiment 5, a category identification reference table is set registering the number of requesting times for every category codes.

Further, an information managing section 2f at the distributing device 2 is provided, in addition to the functions at the embodiment 4, with a sorting section for sorting category codes in the order of the big number of requesting times to the small when the content of the category identification reference table is changed as shown in FIG. 27 and a requesting count identifying section for detecting the category codes of new data sent from the server 1 in a simultaneous manner and identifying whether these category codes have already been registered in the category identification reference table or not and whether the requesting count is over the specified value. The information managing section 2f will permit registration of new data only when the category codes of the new data have been registered in the category identification reference table and the number of times for requesting the category codes is over the specified value.

For example, if the specified value is 5, when data (1) as shown in FIG. 28 are simultaneously sent from the server 1, the information managing section 2f will detect the category code "DOMESTIC NEWS" of the data (1) and retrieve the category identification reference table shown in FIG. 27. In this case, as the number of times for requesting the category code "DOMESTIC NEWS" is "40"($\geq 5$), these data (1) will be registered in the outside storing device 27a.

Also, in the case of data (2), as the number of requesting times is "10"($\geq 5$), they will be registered in the outside storing device 27a. In the case of data (3), however, they will not be registered because the number of requesting times is "0"($\geq$5). Further, as the other parts and functions of the device are similar to those at the embodiment 4, their explanations will be omitted.

The operation of the distributing device 2 at the embodiment 6 will be described hereinbelow.

<OPERATION OF THE DISTRIBUTING DEVICE 2>

Figure 29:
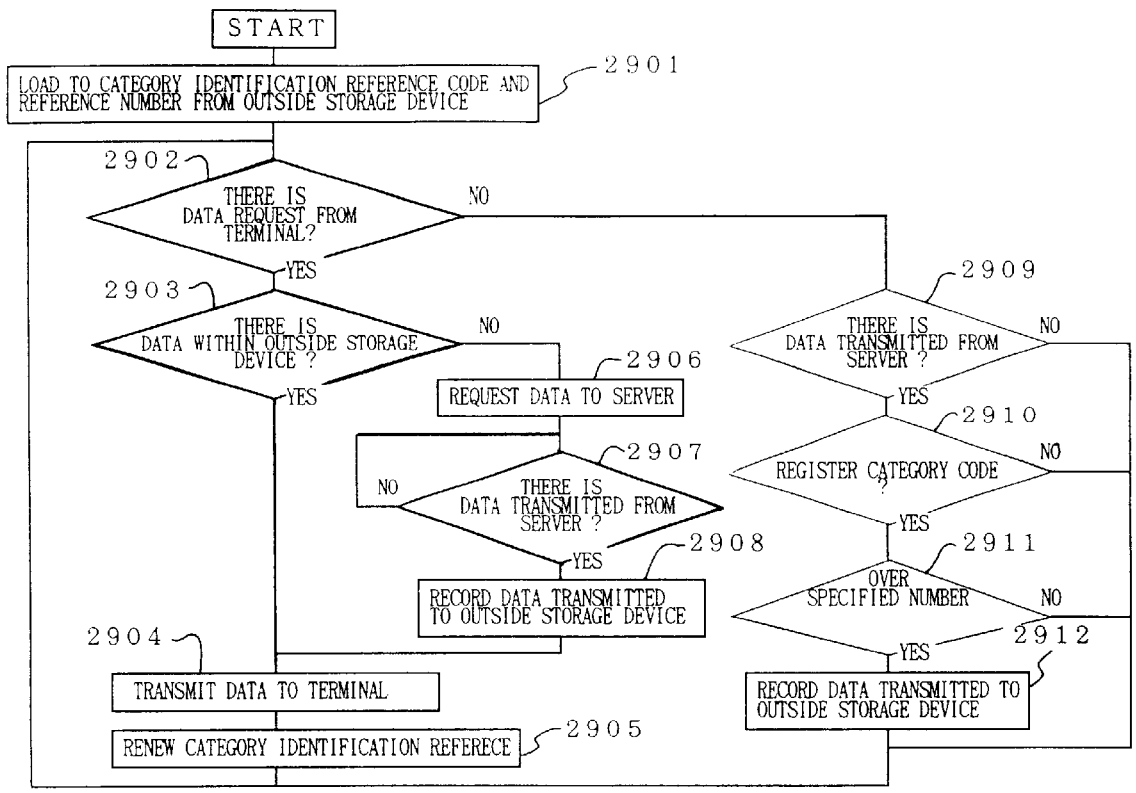
FIG. 29 is a flow chart showing the operation of a distributing device at the embodiment 6.

FIG. 29 is a flow chart showing the operational steps of the distributing device 2.

The information managing section 2f at the distributing device 2 makes accessing to the outside storing device 27a(ROM 25) at the time of starting the distributing device 2 and loads the category identification reference table to the RAM 24 (step 2901).

Then, the terminal side transmitting/receiving section 2b will be placed on standby for data requests from the terminal device 1(step 2902).

Here, when the terminal transmitting/receiving section 2b receives data requests, the storage control 2c will retrieve the outside storing device 27a based on the data requests and identify storage of the requested data(step 2903).

If the requested data have not been registered in the outside storing device 27a, the storage control section 2c will read the requested data and send them to the terminal device 3 via the terminal side transmitting/receiving section 2b(step 2904).

If the requested data have not been registered in the outside storing device 27a at the step 2903, the storage control section 2c will start the server side transmitting/receiving section 2a and send the request asking for requested data transfer to the server 1(step 2906)

Then, the server side transmitting/receiving section 2a receives the requested data from the server 1(step 2907), the storage control section 2c will write them into the outside storing device 27a(step 2908) and send them to the terminal device 1 via the terminal side transmitting/receiving section 2b(step 2904).

When transmission of the requested data is over at the step 2904, the information managing section 2f will detect the category codes of the requested data and renew the content of the category identification reference table based on these category codes (step 2905).

When there are no data requests at the step 2902 and when new data are sent from the server 1 by the communication lines or by radio(step 2909), these new data will be reported to the information managing section 2f.

The information 2f will detect the category codes from the new data and make accessing to the category identification reference table on the RAM 24 based on these category codes. Then, it will identify whether the category codes have been registered or nor(step 2910).

Here, if the category codes have been registered, the information managing section 2f will identify whether the number of times for requesting the category codes is over the specified value or not(step 2911).

If the number of requesting times for the category codes is over the specified value, the information control section 2c will write them into the outside storing device 27a(step 2912).

Figure 30:
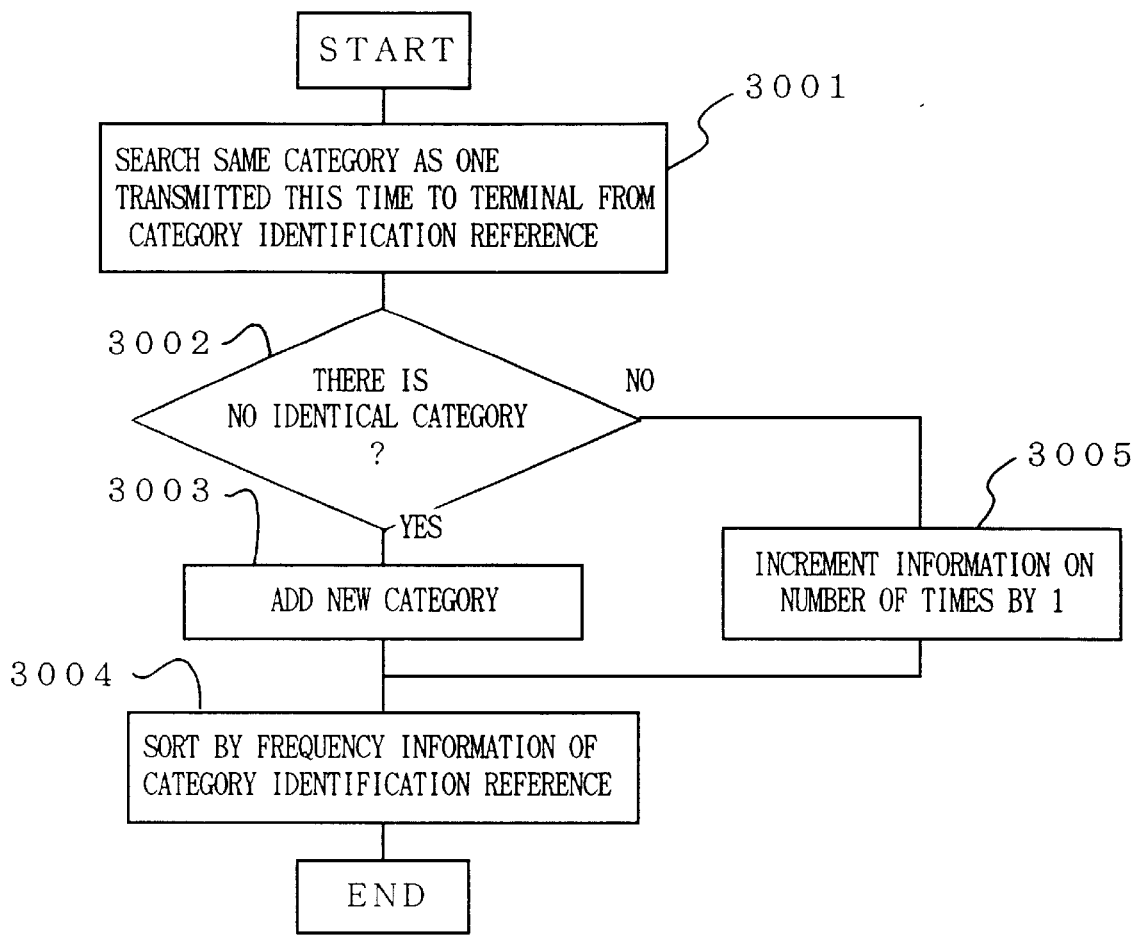
FIG. 30 is a flow chart showing the renewal processing of category identification reference.

The renewing operation carried out at the step 2905 will be described with reference to the flow chart shown in FIG. 30 hereinbelow.

The information managing section 2f will detect the category codes from the data when the data requested by the terminal device 3 are sent thereto(step 3001).

Then, the information managing section 2f will retrieve the category identification reference table on the RAM 24 and identify whether the category codes have been registered or not(step 3002).

Here, if the category codes have not been registered, the information managing section 2f will newly register them on the category identification reference table and at the same time register "1" as the number of times for requesting these category codes (step 3003).

On the other hand, if the category codes have been registered in the category identification reference table at the step 3002, the information managing section 2f will increment the number of times for requesting the category codes by "1"(3005)

When the new registration operation at the step 3003 or the renewing operation at the step 3005 is finished, the information managing section 2f will compare the numbers of times for requesting the respective category codes and arrange them in the order of big to small(step 3004).

<EFFECT OF THE EMBODIMENT 6>

According to the file server at the embodiment 6, by strictly selecting data requested by the users and storing them based on the past data request histories data groups having high request frequencies will be stored by the distributing device. Thus, it will made possible to reduce the amount of data sent from the server to the distributing device at the time of data requests by the users and at the same time to shorten the period of waiting time on the part of the users from the data requests to data obtaining.

EMBODIMENT 7

A the file server at the embodiment 7, in addition to the functions at the embodiment 6 the information managing section 2f at the distributing device 2 is provided with a function for changing specified values depending on the available capacity of the outside storing device 27a. That is, the information managing section 2f is provided with a sorting section for sorting requested data in the order of the big number of requesting times to the small at the time of renewing the content of the category identification reference table, a requesting count identifying section for identifying if the number of times for requesting the category codes of new data is over the specified value at the time of obtaining them and a specified value determining section for changing the specified values depending on the available capacity of the outside storing device 27a. The storage control section 2c is provided with a monitoring section for calculating the available capacity of the outside storing device 27a and reporting its result to the specified value determining section. Here, the specified value determining section will set the value big when the available capacity of the outside storing device 27a becomes small and set the value small when it becomes large. More in detail, in the case where the available capacity of the outside storing device 27a is large, e.g., 1 GB, the specified value will be set at "1", and if the data belonging to the category whose number of requesting times is over "1", the data will be stored in the outside storing device 27a. On the other hand, when the available capacity declines, e.g ., to 1 MB while new data are stored in the outside storing device 27a, the specified value will be set at "100", and if the data belongs to the category whose number of requesting times is over "100", the data will be stored in the outside storing device 27a.

The operational steps of the distributing device 2 at the embodiment 7 will be described hereinbelow.

<OPERATION OF THE DISTRIBUTING DEVICE 2>

Figure 31:
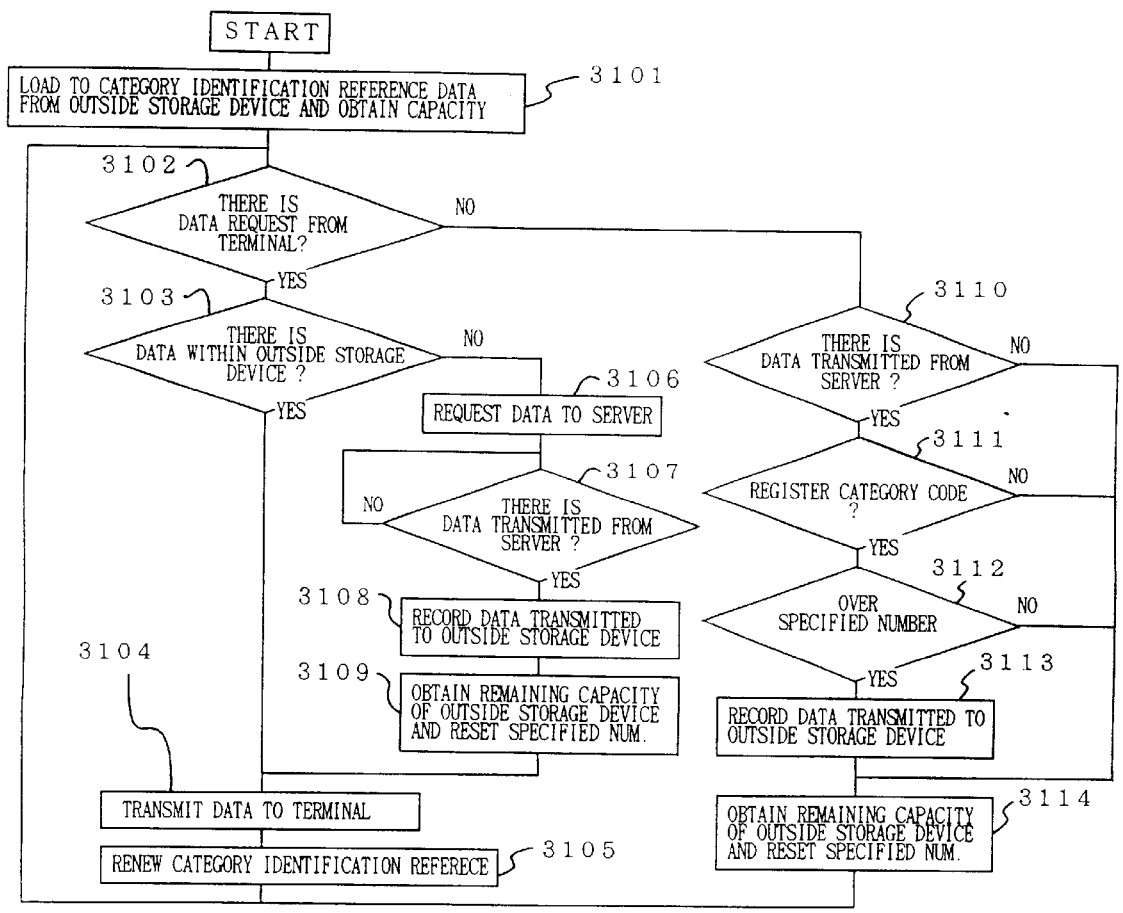
FIG. 31 is a flow chart showing the operation of a distributing device at the embodiment 7.

FIG. 31 is a flow chart showing the operational steps of the distributing device 2.

The information managing section 2f at the distributing device 2 makes accessing to the outside storing device 27a(ROM 25) at the time of starting the distributing device 2 and loads the category identification reference table to the RAM24(step 3101).

Then, the terminal side transmitting/receiving section 2b will be placed on standby for data requests from the terminal device l(step 3102).

When the terminal side transmitting/receiving section 2b receives data requests, the storage control section 2c will retrieve the outside storing device 27a based on the data requests and identify whether they have been stored or not(step 3103).

If the requested data have been registered in the outside storing device 27a, the storage control section 2c will read the requested data and send them to the terminal device 3 via the terminal side transmitting/receiving section 2b(step 3104).

If the requested data have not been registered in the outside storing device 27a at the step 3103, the storage control section 2c will start the server side transmitting/receiving section 2a and report the data requests to the server 1(step 3106).

Then, when the requested data are transmitted from the server 1, the server side transmitting/receiving section 2a will receive them(step 3107). The server side transmitting/receiving section 2a will then transfer the received requested data to the storage control section 2c.

The storage control section 2c will write the requested data into the outside storing section 27a(step 3108). At this time, the monitoring part of the storage control section 2c will calculate the available capacity of the outside storing device 27a after data registration and report its result to the information managing section 2f. The specified value determining part of the information managing section 2f will reset the specified value in accordance with the available capacity (step 3109). Also, the data will be sent to the terminal device 1 by the terminal side transmitting/receiving section 2b(step 3104).

When transmission of the requested data is finished at the step 3104, the information managing section 2f will detect the category codes of the requested data and renew the content of the category identification reference table based on the category codes(step 3105). As this renewing operation is the same as the one at the embodiment 5 or 6, its description will be omitted.

Further, when there are no data requests at the step 3102 and when new data are sent from the server 1 by the communication lines or by radio(step 3110), these new data will be reported to the information managing section 2f.

The information managing section 2f will detect the category codes from the new data and based on these category codes make accessing to the category identification reference table on the RAM 24. Then, it will identify whether these category codes have been registered or not (step 3111).

Here, if the category codes have been registered, the request count identifying section will identify whether the number of times for requesting the category codes is over the specified value or not(step 3112).

If the above number is over the specified value, the storage control section 2c will write the new data into the outside storing device 27a(step 3113). At this time, the monitoring part of the storage control section 2c will calculate the available capacity of the outside storing device 27a after registration of the new data and report its result to the information managing section 2f. The specified value determining part of the information managing section 2f will reset the specified value based on the available capacity of the outside storing device 27a(step 3114).

<EFFECT OF THE EMBODIMENT 7>

According to the file server at the embodiment 7, by identifying registration of the new data based on the history of the past user requests and the available capacity of the outside storing device it will be made possible to hold only optimal data desired by the users at the minimum storage capacity. Also, it will be possible to reduce the amount of data communications between the distributing device and the server at the time of data requests by the users and at the same time to shorten the period of waiting time on the part of the users from the time of data requests to the time of obtaining the data by touring the optimal data desired by the users in the distributing device.

EMBODIMENT 8

Figure 33:
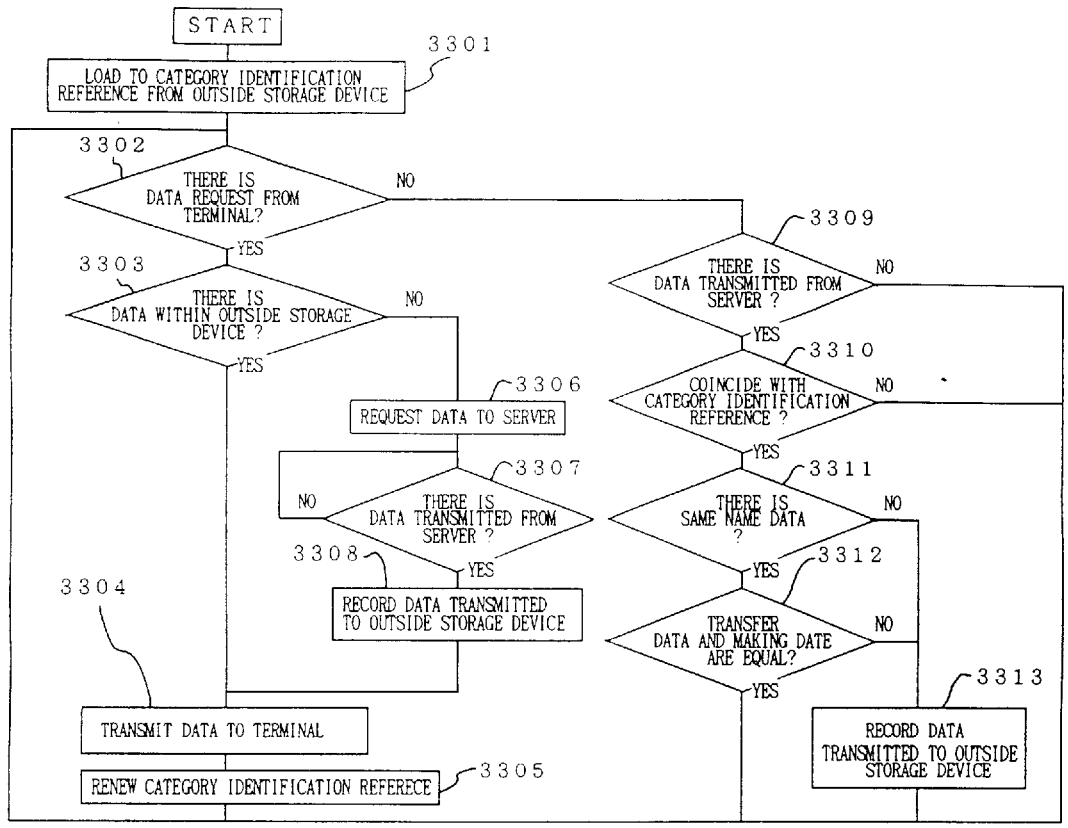
FIG. 33 is a flow chart showing the operation of a distributing device at the embodiment 8.

In the file server at the embodiment 8, as different from the embodiment 5, 6 or 7, data names, category codes, data making dates, data expiration dates and data lengths are added to data transmitted and received among a server 1, a distributing device 2 and a terminal device 3 (see FIG. 33).

Accordingly, in addition to those at the embodiment 5, 6 or 7, the information managing section 2f of the distributing device 2 is provided with a data comparing section for identifying the existence of the data having the same names in an outside storing device 97b when data are sent simultaneously from the server 1 and comparing the making dates of the received data and those of the data in the outside storing device if the existence is identified. This comparing section is for data having the same names, e.g., news and renewed every specified time intervals. It erases data having old making dates and register data newly made. Thus, the outside storing device 27a can register new data when necessary.

Further, the information managing section 2f is provide with a data erasing section for consulting the finishing dates of data stored in the outside storing device 27a at every specified time intervals and erasing the data passing the finishing dates.

The operational steps of the distributing device 2 at the embodiment 8 will be described hereinbelow.

<OPERATION OF THE DISTRIBUTING DEVICE 2>

FIG. 33 is a flow chart showing the operation of the distributing device 2 at the embodiment 8.

The information managing section 2f of the distributing device 2 makes accessing to the outside storing device 27a(ROM 25) at the time of starting the distributing device 2 and loads the category identification reference table to the RAM 24(step 3301).

Then, the terminal side transmitting/receiving section 2b will be placed on standby for data requests from the terminal device l(step 3302).

Here, when the terminal side transmitting/receiving section 2b receives data requests, the storage control section 2c will retrieve the outside storing device 27a based on the data requests and identify storage thereof(step 3303).

If there are requested data registered in the outside storing device 27a, the storage control section 2c will read the requested data and send them to the terminal device 3 via the terminal side transmitting/receiving section 2b(step 3304).

If there are no requested data registered in the outside storing device 27a at the step 3303, the storage control section 2c will start the server side transmitting/receiving section 2a and send the request asking for requested data transfer to the server 1(step 3306).

Then, when the server side transmitting/receiving section 2a receives the requested data from the server 1(step 3307), the storage control section 2c will write them into the outside storing device 27a(step 3308) and the terminal side transmitting/receiving section 2b will send them to the terminal device 3(step 3304)

When transmission of the requested data is finished at the step 3304, the information managing section 2f will detect the category codes of the requested data and renew the content of the category identification reference table based on these category codes(step 3305). As this new processing is similar to the one at the embodiment 5 or 6, its description will be omitted.

Further, when there are no data requests at the step 3302 and when new data are sent from the server 1 by the communication lines or radio(step 3309), these new data will be reported to the information managing section 2f. The information managing section 2f will detect the category codes from the new data and make accessing to the category identification reference table on the RAM 24 based in these category codes. Then, it will identify registration of these category codes (and if the number of times for requesting them is over the specified value) (step 3310).

Here, if the category codes have been registered(and the number of times for requesting them is over the specified value), the information managing section 2f will start the storage control section 2c and identify registration of data having the same names as the new data in the outside storing device 27a(step 3311).

Here, if the data having the same names have been registered, the information managing section 2f will identify the making dates of the new data are the same as those of the data registered in the outside storing device 27a(step 3312). If they are the same, the information managing section 2f will abolish the new data received from the server 1.

On the other hand, in the case where no data having the same names as the new data have not been registered in the outside storing device 27a at the step 3311, the storage control section 2c will register the new data in the outside storing device 27a(step 3313).

Further, if the making dates of the new data are newer than those of the data registered in the outside storing device 27a, the storage control section 2c will write the new data into the outside storing section 27a(step 3313).

Furthermore, the information managing section 2f may be provided with a function for filtering data whose making date is 12 o'clock and finishing date is 13 o'clock on the same day, for example, so as not to store them in the outside storing device.

<EFFECT OF THE EMBODIMENT 8>

According to the file server at the embodiment 8, in the case of data whose contents are renewed at every time intervals, foe example, news, holding of newest data can be allowed when necessary.

EMBODIMENT 9

In the file server at the embodiment 9, different from the embodiment 8, the transmission/receiving section 1a of the server 1 is provided with a function for sending data attribution including data names, category codes, data lengths and data main body transmission starting time (see FIG. 34) and after transmission of this data attribution sending the data main body added with the data names and the data lengths (see FIG. 35) in the case where new data are sent in a simultaneous manner.

Further, a writing section 1c is provided with a function for detecting the transfer starting time from the data attribution sent to a distributing device 2 and writing this transfer starting time in a RAM 15.

A state control section 1d is provided with a function for restarting the transmitting/receiving section 1a and sending the data main body when current time is obtained from a clock 14 and the current time is coincident with the transfer time on the RAM 15.

The other parts of the construction of the server 1 and the functions are the same as those at the embodiment 3, and thus their descriptions will be omitted.

In addition of the functions of the server 1 described earlier, the storage control section 2c of the distributing device 2 is provided with a function for detecting the transfer starting time and write it on a RAM 24 when receiving the data attribution and the starting time.

Further, the state control section 2d of the distributing device 2 is provided with a function for obtaining the current time from a clock 26 and identifying its coincidence with the transfer starting time on the RAM 24. When they coincide, it will start a server side transmitting/receiving section 2a and be placed on standby for receiving of the data main body.

The other parts and functions of the distributing device are the same as those at the embodiment 5, 6, 7 or 8, and thus their descriptions will be omitted.

The operation of the file server at the embodiment 9 will be described hereinbelow.

<OPERATION OF THE SERVER 1>

Figure 36:
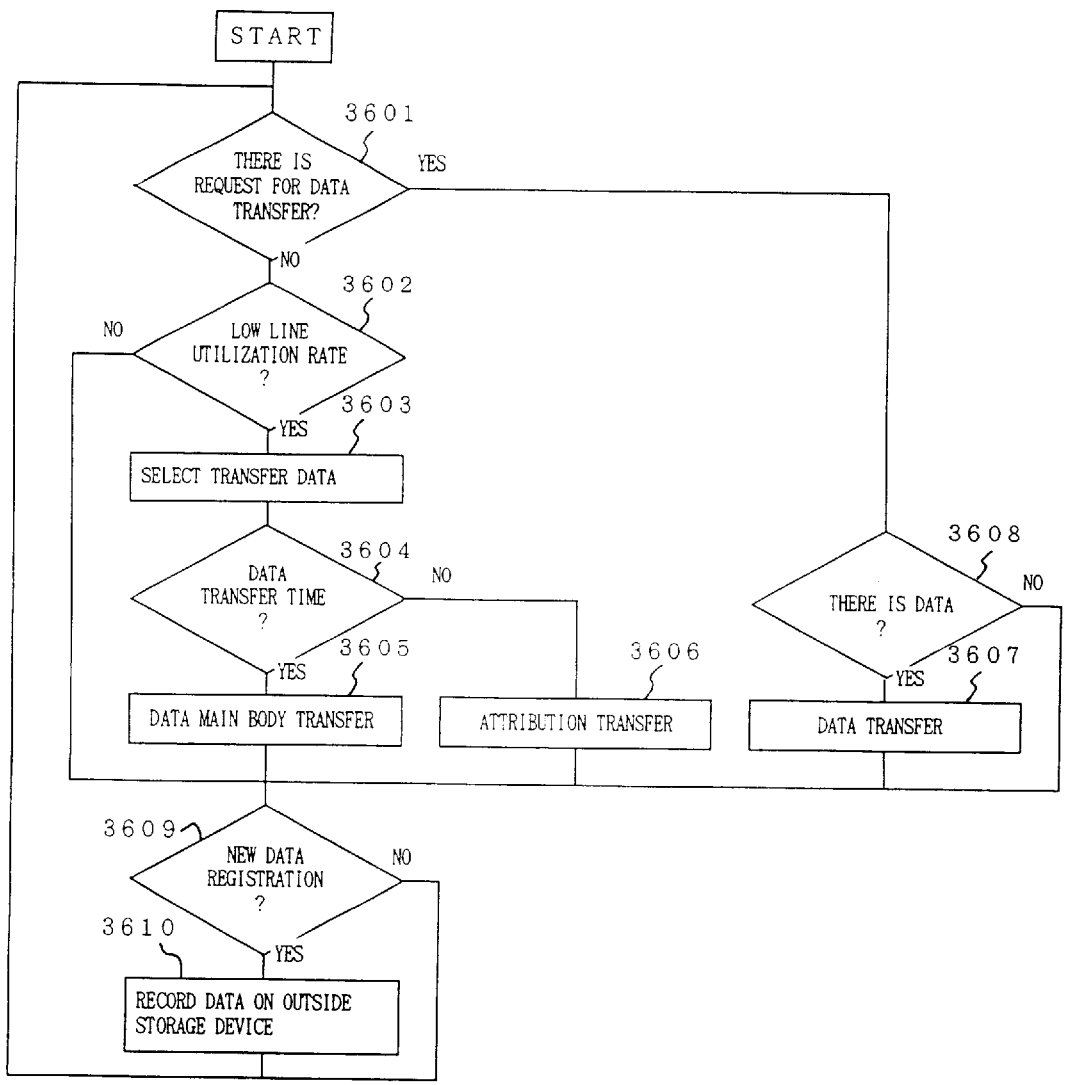
FIG. 36 is a flow chart showing the operation of a server at the embodiment 9.

The operation of the server 1 at the embodiment 9 will be described with reference to FIG. 36.

The transmitting/receiving section 1a of the server 1 is placed on standby for data transfer requests from the distributing device 2(step 3601).

Here, if there are no data transfer requests from the distributing device 2, the state control section 1d will detect the utilization amount of each communication line connected to the distributing device 2(step 3602).

If there is still some availability of the communication line remaining, the new data to be transferred will be selected(step 3603), the current time will be obtained from the clock 14 and compared with the transfer starting time written on the RAM 15(step 3604). Here, if there are data whose transfer starting time coincides with the current time, the transmitting/receiving section 1a will transfer the main body of these data to the distributing device 1(step 3605) .

On the other hand, if there are no data whose transfer starting time coincides with the current time, the transmitting/receiving section 1a will send the data attribution selected at the step 3603 to the distributing device 2(step 3606).

When the transmitting/receiving section 1a receives data transfer requests at the step 3601, an information reading section 1b will retrieve the outside storing device 17a and identify registration thereof(step 3607). Then, if the requested data have been registered in the outside storing device 17a, the transmitting/receiving section 1a will send the data read by the information reading section 1b to the data requesting distributing device 2(step 3608).

Further, when there are no data transfer requests at the step 3601 and when the user inputs commands for registering new data to the outside storing device 17a without inputting commands for transferring new data even if there is still some availability of the communication lines remaining(step 3609), the writing section 1c will be started, new data stored in such storage medium as a magnetic disk, an optical disk or the like will be read, or new data will be received from the other server 1 and written in the outside storing section 18a(step 3601).

Next, the operation of the distributing device 2 at the embodiment 9 will be described.

<OPERATION OF THE DISTRIBUTING DEVICE 9>

Figure 37:
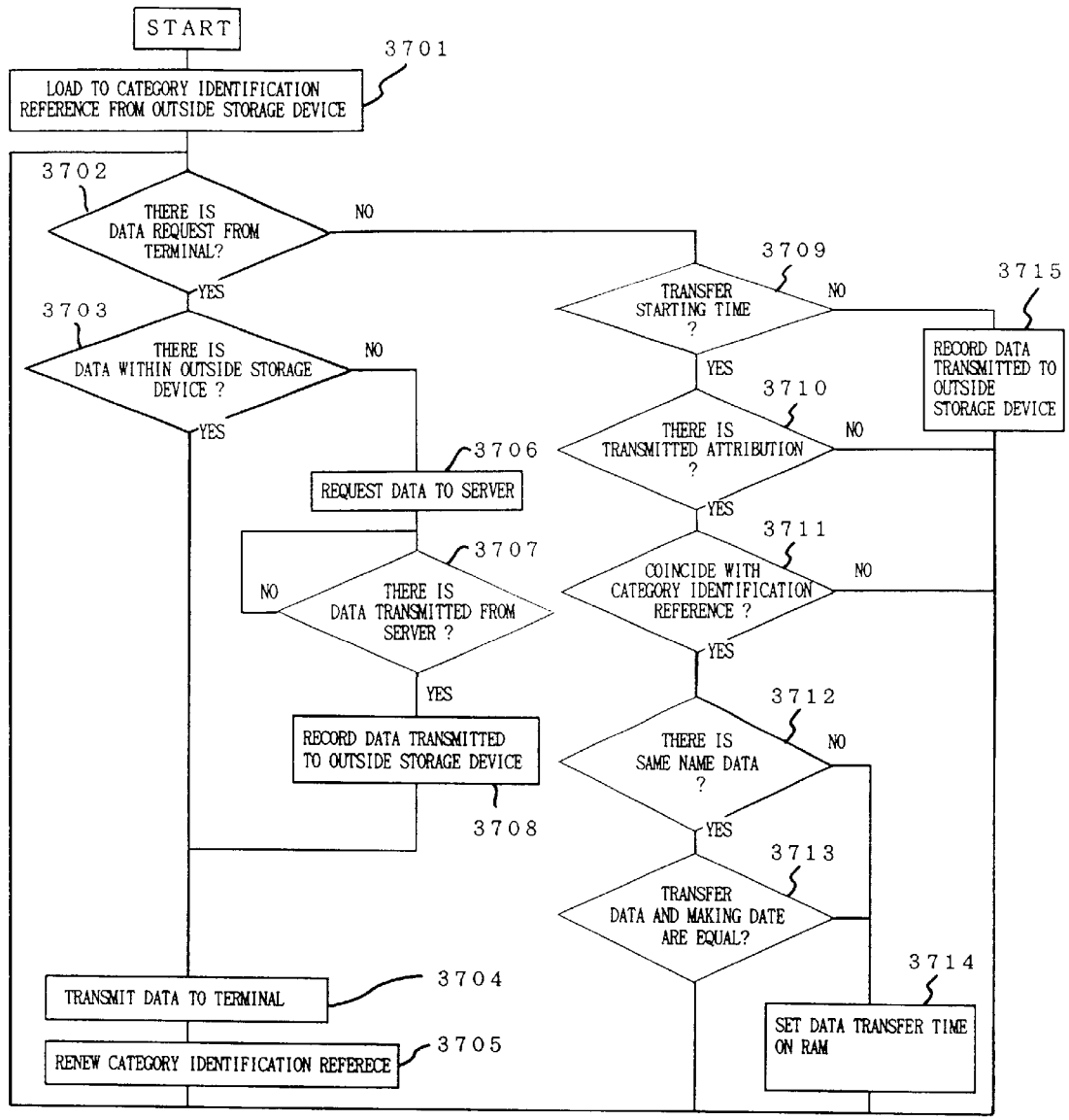
FIG. 37 is a flow chart showing the operation of a distributing device at the embodiment 9.

FIG. 37 is a flow chart showing the operation of the distributing device 2 at the embodiment 9.

The information managing section 2f of the distributing device 2 makes accessing to the outside storing device 27a(ROM 25) at the time of starting the distributing device 2 and loads the category identification reference table to a RAM 24(step 3701).

Then, the terminal side transmitting/receiving section 2b will be placed on standby for data requests from the terminal device l(step 3702).

Here, when the terminal side transmitting/receiving section 2b receives data requests, the storage control section 2c will retrieve the outside storing device 27a based on the data requests and identify storage thereof(step 3703).

If there are data as requested registered in the outside storing device 27a, the storage control section 2c will read the requested data and send them to the terminal device 3 via the terminal side transmitting/receiving section 2b(step 3704).

If there are no data as requested registered in the outside storing section 27a at the step 3703, the storage control section 2c will start the server side transmitting/receiving section 2a and send the request asking for transfer of the requested data to the server 1(step 3706).

Then, when the server side transmitting/receiving section 2a receives the requested data from the server 1(step 3707), the storage control section 2c will write them into the outside storing section 27a(step 3708) and the terminal side transmitting/receiving section 2b will send them to the terminal device 3(step 3704).

When transmission of the requested data is finished at the step 3704, the information managing section 2f will detect the category codes of the requested data and renew the content of the category identification reference table based on these category codes(step 3705). As this renewing operation is the same as in the case of the embodiment 5, 6 or 7, its description will be omitted.

If there are no data requests at the step 3702 on the other hand, the state control section 2d will obtain current time from the clock 26 and compare it with the transfer starting time written on the RAM 24(step 3709). Here, if there are no data whose transfer starting time is not coincident with the current time, the server side transmitting/receiving section 2a will be placed on standby for data attribution from the server 1(step 3710). When the server side transmitting/receiving section receives the data attribution from the server 1, the information managing section 2f will detect the category codes from the new data and make accessing to the category identification reference table on the RAM 24 based on these category codes. Then, it will identify whether these category codes satisfy the category identification reference or not (whether the category codes have been registered in the category identification reference table or not, and whether the number of times for requesting the category codes is over the specified value or not) (step 3711).

Here, if the category codes satisfy the category identification reference, the information managing section 2f will start the storage control section 2c and identify storage of data having the same names as the new data in the outside storing device 27a(step 3712).

Here, if there are data having the same names registered, the information managing section 2f will identify whether the making dates of the new data are coincident with those of the data registered in the outside storing device 27a(step 3713). If they coincide, the information managing section 2f will abolish the new data received from the server 1.

On the other hand, if there are no data having the same names as the those of the new data at the step 3713, the storage control section 2c will detect the transfer starting time from the data attribution and write it on the RAM 24(step 3714).

If the making dates of the new data are newer than those of the data registered in the outside storing device 27a at the step 3312, the storage control section 2c will detect the transfer starting time from the data attribution and write it on the RAM 24(step 3714).

If there exist data whose transfer starting time is coincident with the current time at the step 3709, the server side transmitting/receiving section 2a will start the operation of receiving the main body of the data. Then, when the server side transmitting/receiving section 2a receives the data main body, the storage control section 2c will write the data main body into the outside storing device 27a(step 3715).

<EFFECT OF THE EMBODIMENT 9>

According to the file server at the embodiment 9, it will not be necessary to monitor end of previous data transfer so as to select the following data or to transmit the following data in the case where a plurality of data are continuously sent from the server, and thus it will be made possible to reduce loads on the server and the distributing device.

EMBODIMENT 10

In the file server at the embodiment 10, analog lines are used in addition to such digital lines as ISDN or the like connecting the distributing device and the terminal device 3. That is, in the case where transmissions of video images are requested by the users, data will be sent between the server 1 and the distributing device 2 by digital signals, but at the distributing device 2 the digital signals will be transformed into analog signals and sent to the terminal device 3.

Figure 38:
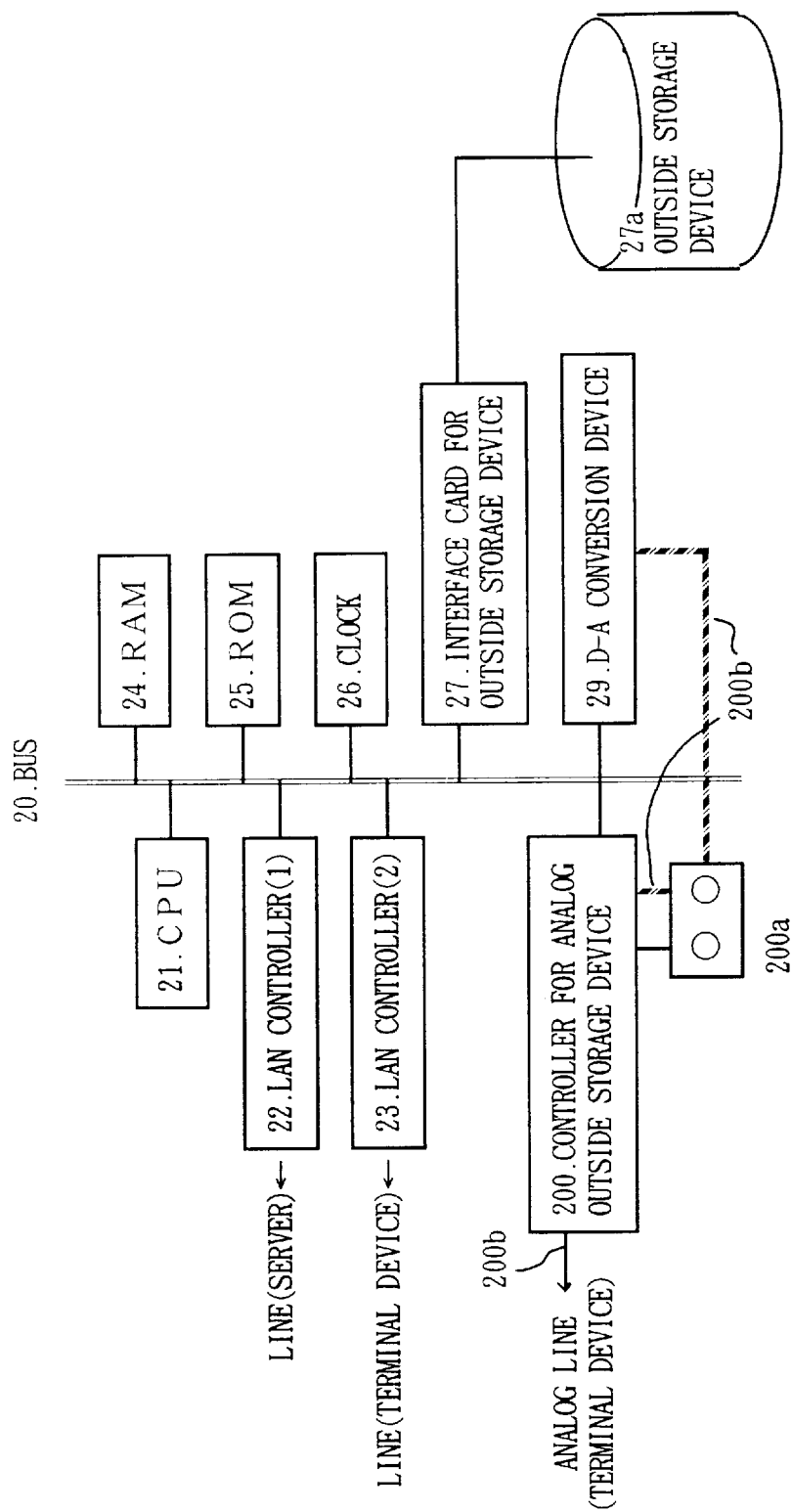
FIG. 38 is a view showing the hardware construction of a distributing device at the embodiment 10.

Accordingly, the distributing device 2 is provided with a D/A converter 29 for transforming digital signals into analog signals and an analog outside storing device 200a for storing data in the form of analog signals. The analog outside storing device 200a is the one constructed by, for example, a video tape and a video reproducing device and connected via an analog outside storing device control device 200 (see FIG. 38).

In the case where data having the form of digital signals stored in the outside storing device 27a are sent to the terminal device 3, they will be transformed from digital signals to analog signals by the D/A converter 29, stored in the analog outside storing device 200a and sent to the terminal device 3 via analog lines 200a.

Further, in the case of data of video images, etc., they may be transformed into analog signals and stored in the analog outside storing device 200a beforehand.

Figure 39:
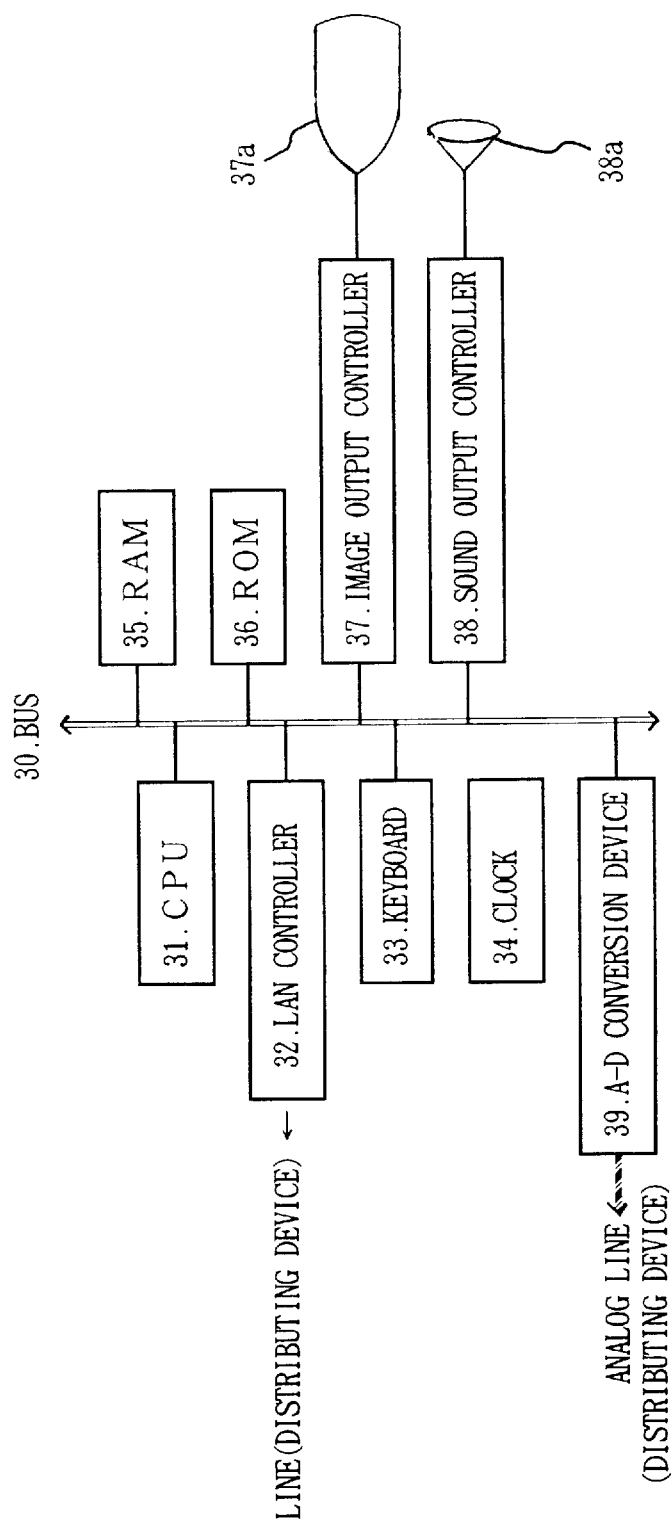
FIG. 39 is a view showing the hardware construction of a terminal device at the embodiment 10.

Accordingly, the terminal device 3 may be provided with an A/D converter 39 (see FIG. 39) by which data sent by analog lines can be transformed into digital signals or the data may be input intact as analog signals.

<EFFECT OF THE EMBODIMENT 10>

According to the embodiment 10, in the case where a large amount of data is transmitted as by the video transfer system, etc., by omitting digitization of information on users'data requests, charging, etc., and sending it by such communication lines as analog telephone lines, or the like, it will be made possible to attain a high speed for digitizing requested data and to reduce communication costs for the users.

What is claimed is:

1. A file server comprising:
    a server for storing and providing data;
    terminal device for outputting the data provided by said server;
    a distributing device between said server and said terminal device for storing parts of data stored by said server, said distributing device comprising:
        storing means for storing a specified number of data;
        terminal side transmitting/receiving means for receiving a request for data from said terminal device and for transmitting the data corresponding to the request to said terminal device;

storage control means for outputting the data, corresponding to the request, from said storing means to the said terminal side transmitting/receiving means if the data corresponding to the request is stored in said storing means, and for writing new data received from said server into said storing means;

server side transmitting/receiving means for transmitting the request for data from said terminal to said server if the data corresponding to the request is not stored in said storing means, and for receiving the data corresponding to the request from said server; and state control means for identifying whether the request for data from said terminal device has been received and whether data is being transmitted to said terminal device, and for making said server side transmitting/receiving means transmit a request for new data to said server causing said storage control means to write the new data received by said server side transmitting/receiving means if said state control means identifies that no request for data from said terminal devices have been received and that no data is being transmitted to said terminal devices.

2. The file server according to claim 1, wherein category codes identifying the kinds of data are added to said respective data;

said distributing device is provided with a category identification reference table for registering identification information identifying whether to store data belonging to each category identified by the category codes; and further comprising an information managing means for identifying whether to store new data by retrieving the identification information from said category identification reference table based on the category codes of said new data when new data is received from said server.

3. The file server according to claim 2, wherein said identification information sets forth the number of times data belonging to each respective category has been requested;

said information managing means, when receiving new data from said server, consults said category identification reference table based on the category codes of the new data and permits storing of the new data if the number of times for said category codes is over a specified value; and when data requested by said terminal device is received from said server, said information managing means retrieves the category identification reference table based on the category codes of the data and renews the number of times for said category codes.

4. The file server according to claim 3, wherein if a specified number of data have been registered in said storing means, when new data belonging to categories whose number of times is over a specified value are received, said information managing means identifies data belonging to categories whose number of times is the smallest by consulting said category identification reference table, makes said storage control means erase said data and at the same time store said new data.

5. The file server according to claim 3, wherein said storage control means is provided with a capacity detecting section for detecting available capacity of said storing means, and said information managing means is provided with a specified value determining section for determining said specified value in accordance with available capacity detected by said available capacity detecting section.

6. The file server according to claim 1, wherein said state control means identifying receiving of requests from said monitors available capacity of communication lines connected to said distributing device, and no requests have been received from said distributing device and the communication lines have sufficiently available capacity said state control means simultaneously sends new data to a plurality of distributing devices.

7. The file server according to claim 1, wherein said server compresses data when sending said data to said distributing device; and said distributing device expands data when sending said data received from said server to said terminal device.

8. The file server according to claim 1, wherein said server sends a transmission starting time of new data before sending said new data to said distributing device; and said distributing device starts the operation of receiving new data in accordance with the transmission starting time.

9. The file server according to claim 1, wherein when receiving data via digital signals from said server, said distributing device transforms the data into analog signals and sends them to said terminal device.

* * * * *

UNITED STATES PATENT AND TRADEMARK OFFICE
CERTIFICATE OF CORRECTION

PATENT NO. : 5,809,298
DATED : September 15, 1998
INVENTOR(S) : Nakada

Figure 12:
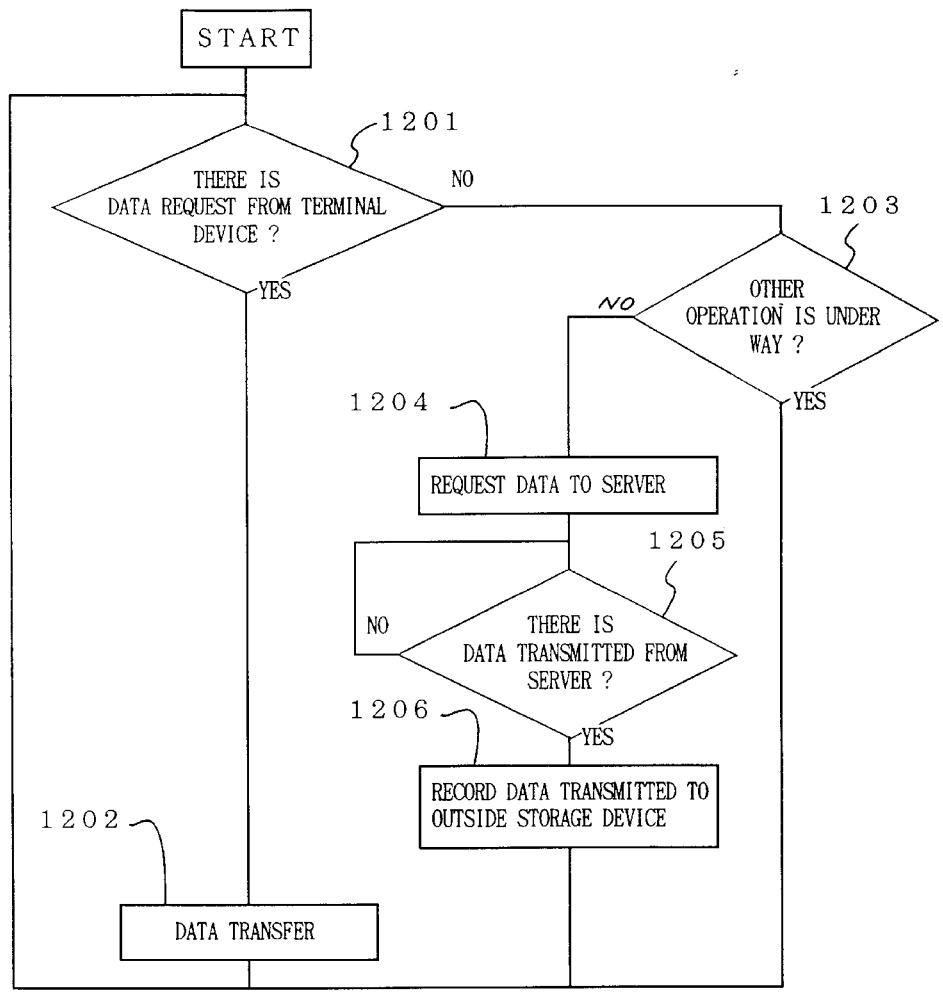
FIG. 12 is a flow chart showing an information storage processing at a distributing device.

It is certified that error appears in the above-indentified patent and that said Letters Patent is hereby corrected as shown below:

Fig. 12 [IN THE DRAWINGS], delete stamp in upper lefthand corner.

Col. 9, line 23, delete ",".

Col. 19, line 1, start a NEW PARAGRAPH with "Further".

Col. 28, line 28, before "no" insert --where--;

line 40, start a NEW PARAGRAPH with "said" (third occurrence).

Signed and Sealed this

Sixteenth Day of February, 1999

Attest:

*Acting Commissioner of Patents and Trademarks*

*Attesting Officer*